United States Patent
Wilcutts et al.

(10) Patent No.: US 11,555,461 B2
(45) Date of Patent: Jan. 17, 2023

(54) NOISE, VIBRATION AND HARSHNESS REDUCTION IN A SKIP FIRE ENGINE CONTROL SYSTEM

(71) Applicants: Tula Technology, Inc., San Jose, CA (US); Cummins Inc., Columbus, IN (US)

(72) Inventors: Mark A. Wilcutts, Berkeley, CA (US); Xi Luo, San Jose, CA (US); Anastasios Arvanitis, San Jose, CA (US)

(73) Assignee: Tula Technology, Inc., San Jose, CA (US)

(*) Notice: Subject to any disclaimer, the term of this patent is extended or adjusted under 35 U.S.C. 154(b) by 298 days.

(21) Appl. No.: 17/075,072

(22) Filed: Oct. 20, 2020

(65) Prior Publication Data
US 2022/0120230 A1 Apr. 21, 2022

(51) Int. Cl.
*F02D 41/00* (2006.01)
*F02D 41/02* (2006.01)
(Continued)

(52) U.S. Cl.
CPC ......... *F02D 41/0082* (2013.01); *B60W 10/06* (2013.01); *B60W 10/08* (2013.01); *B60W 30/20* (2013.01); *F01M 1/02* (2013.01); *F01M 5/001* (2013.01); *F01N 3/021* (2013.01); *F01N 3/101* (2013.01); *F01N 3/2033* (2013.01);
(Continued)

(58) Field of Classification Search
CPC .... F02D 2200/021; F02D 13/06; F02D 29/02; F02D 41/064; F02D 41/08; F02D 41/1401; F02D 2041/141; F01M 2001/0246; F01M 1/16; F01M 5/021; F01N 2430/06; F01N 2430/10; F01N 3/025; F01N 3/0253; F01N 2610/02; B60W 2510/0676; B60W 2710/0694; B60W 2710/085; B60W 20/15; Y02T 10/12
See application file for complete search history.

(56) References Cited

U.S. PATENT DOCUMENTS

| 4,434,767 A | 3/1984 | Kohama et al. |
| 4,489,695 A | 12/1984 | Kohama et al. |

(Continued)

FOREIGN PATENT DOCUMENTS

| CN | 101298249 | 9/2012 |
| CN | 102060014 | 4/2014 |

(Continued)

OTHER PUBLICATIONS

International Search Report and Written Opinion dated Jan. 21, 2022 from International Application No. PCT/US2021/052998.

*Primary Examiner* — Sizo B Vilakazi
(74) *Attorney, Agent, or Firm* — Beyer Law Group LLP

(57) ABSTRACT

A variety of methods and arrangements for reducing noise, vibration and harshness (NVH) in a skip fire engine control system are described. In one aspect, a firing sequence is used to operate the engine in a skip fire manner. A smoothing torque is determined that is applied to a powertrain by an energy storage/release device. The smoothing torque is arranged to at least partially cancel out variation in torque generated by the skip fire firing sequence. Various methods, powertrain controllers, arrangements and computer software related to the above operations are also described.

37 Claims, 13 Drawing Sheets

(51) Int. Cl.

| | | |
|---|---|---|
| *F02D 41/14* | (2006.01) | |
| *F02D 13/02* | (2006.01) | |
| *F01N 3/20* | (2006.01) | |
| *F02D 41/40* | (2006.01) | |
| *F01M 5/00* | (2006.01) | |
| *F01N 3/10* | (2006.01) | |
| *F01N 3/021* | (2006.01) | |
| *B60W 10/08* | (2006.01) | |
| *F01M 1/02* | (2006.01) | |
| *F02B 67/06* | (2006.01) | |
| *B60W 10/06* | (2006.01) | |
| *B60W 30/20* | (2006.01) | |
| *F02D 41/06* | (2006.01) | |

(52) U.S. Cl.
CPC ............ *F01N 3/2066* (2013.01); *F02B 67/06* (2013.01); *F02D 13/0203* (2013.01); *F02D 13/0223* (2013.01); *F02D 41/0245* (2013.01); *F02D 41/068* (2013.01); *F02D 41/1454* (2013.01); *F02D 41/1498* (2013.01); *F02D 41/401* (2013.01); *B60W 2030/206* (2013.01); *B60W 2510/02* (2013.01); *F02D 2200/021* (2013.01)

(56) References Cited

U.S. PATENT DOCUMENTS

| | | |
|---|---|---|
| 4,509,488 A | 4/1985 | Forster et al. |
| 4,699,097 A | 10/1987 | Tanaka et al. |
| 5,020,491 A | 6/1991 | Mashino |
| 5,377,631 A | 1/1995 | Schechter |
| 5,461,289 A | 10/1995 | Adler et al. |
| 5,568,795 A | 10/1996 | Robichaux et al. |
| 5,806,617 A | 9/1998 | Yamaguchi |
| 5,853,306 A | 12/1998 | Worth et al. |
| 6,085,723 A | 7/2000 | Pels et al. |
| 6,149,544 A | 11/2000 | Masberg et al. |
| 6,158,411 A | 12/2000 | Morikawa |
| 6,232,733 B1 | 5/2001 | Obayashi et al. |
| 6,307,276 B1 | 10/2001 | Bader |
| 6,364,807 B1 | 4/2002 | Koneda et al. |
| 6,394,208 B1 | 5/2002 | Hampo et al. |
| 6,405,701 B1 | 6/2002 | Masberg et al. |
| 6,408,625 B1 | 6/2002 | Woon et al. |
| 6,438,944 B1 | 8/2002 | Bidner et al. |
| 6,441,506 B2 | 8/2002 | Nakashima |
| 6,464,028 B1 | 10/2002 | Imani |
| 6,478,705 B1 | 11/2002 | Holmes et al. |
| 6,487,998 B1 | 12/2002 | Masberg et al. |
| 6,588,392 B2 | 7/2003 | Armstrong et al. |
| 6,591,200 B1 | 7/2003 | Cohen et al. |
| 6,619,258 B2 | 9/2003 | McKay et al. |
| 6,691,807 B1 | 2/2004 | Bhavsar et al. |
| 6,692,404 B2 | 2/2004 | Matsubara et al. |
| 6,740,002 B1 | 5/2004 | Stridsberg |
| 6,746,366 B2 | 6/2004 | Tamor |
| 6,886,524 B2 | 5/2005 | Hanada et al. |
| 6,943,460 B2 | 9/2005 | Wakashiro et al. |
| 6,986,399 B2 | 1/2006 | Bhavsar et al. |
| 7,021,409 B2 | 4/2006 | Tamor |
| 7,058,487 B2 | 6/2006 | Hara et al. |
| 7,063,062 B2 | 6/2006 | Lewis et al. |
| 7,066,136 B2 | 6/2006 | Ogiso |
| 7,086,386 B2 | 8/2006 | Doering |
| 7,104,244 B2 | 9/2006 | Nishi et al. |
| 7,154,236 B1 | 12/2006 | Heap |
| 7,198,029 B1 | 4/2007 | Wong et al. |
| 7,225,782 B2 | 6/2007 | Pallett et al. |
| 7,232,401 B2 | 6/2007 | Albertson |
| 7,275,518 B1 | 10/2007 | Gartner et al. |
| 7,278,392 B2 | 10/2007 | Zillmer et al. |
| 7,350,499 B2 | 4/2008 | Takaoka et al. |
| 7,377,250 B1 | 5/2008 | Duffy |
| 7,456,509 B2 | 11/2008 | Gray |
| 7,503,312 B2 | 3/2009 | Sumilla et al. |
| 7,523,734 B2 | 4/2009 | Albertson et al. |
| 7,530,413 B2 | 5/2009 | Rayl |
| 7,577,511 B1 | 8/2009 | Tripathi et al. |
| 7,580,779 B2 | 8/2009 | Zillmer et al. |
| 7,849,835 B2 | 12/2010 | Tripathi et al. |
| 7,886,715 B2 | 2/2011 | Tripathi et al. |
| 7,930,087 B2 | 4/2011 | Gibson et al. |
| 7,954,474 B2 | 6/2011 | Tripathi et al. |
| 7,996,145 B2 | 8/2011 | Snyder |
| 8,015,960 B2 | 9/2011 | Watanabe |
| 8,099,224 B2 | 1/2012 | Tripathi et al. |
| 8,131,445 B2 | 3/2012 | Tripathi et al. |
| 8,131,447 B2 | 3/2012 | Tripathi et al. |
| 8,335,634 B2 | 12/2012 | Kang et al. |
| 8,464,690 B2 | 6/2013 | Yuille et al. |
| 8,532,828 B2 | 9/2013 | Schramm et al. |
| 8,616,181 B2 | 12/2013 | Sahandiefanjani et al. |
| 8,626,411 B2 | 1/2014 | Whitney et al. |
| 8,701,628 B2 | 4/2014 | Tripathi et al. |
| 8,715,136 B1 | 5/2014 | Dai et al. |
| 8,839,766 B2 | 9/2014 | Serrano |
| 8,847,426 B2 | 9/2014 | Heap et al. |
| 8,869,773 B2 | 10/2014 | Tripathi et al. |
| 8,880,258 B2 | 11/2014 | Breton et al. |
| 8,892,330 B2 | 11/2014 | Yuille et al. |
| 9,086,020 B2 | 7/2015 | Tripathi et al. |
| 9,120,478 B2 | 9/2015 | Carlson et al. |
| 9,200,587 B2 | 12/2015 | Serrano |
| 9,239,037 B2 | 1/2016 | Carlson et al. |
| 9,249,748 B2 | 2/2016 | Verner |
| 9,267,454 B2 | 2/2016 | Wilcutts et al. |
| 9,273,643 B2 | 3/2016 | Carlson et al. |
| 9,291,106 B2 | 3/2016 | Switkes et al. |
| 9,328,672 B2 | 5/2016 | Serrano et al. |
| 9,387,849 B2 | 7/2016 | Soliman et al. |
| 9,399,963 B2 | 7/2016 | Loucks et al. |
| 9,399,964 B2 | 7/2016 | Younkins et al. |
| 9,416,743 B2 | 8/2016 | Beikmann |
| 9,512,794 B2 | 12/2016 | Serrano et al. |
| 9,562,470 B2 | 2/2017 | Younkins et al. |
| 9,581,097 B2 | 2/2017 | Younkins et al. |
| 9,650,971 B2 | 5/2017 | Pirjaberi et al. |
| 9,664,130 B2 | 5/2017 | Wilcutts et al. |
| 9,725,082 B2 | 8/2017 | Soliman et al. |
| 9,745,905 B2 | 8/2017 | Pirjaberi et al. |
| 9,777,658 B2 | 10/2017 | Nagashima et al. |
| 9,784,644 B2 | 10/2017 | Chen et al. |
| 9,790,867 B2 | 10/2017 | Carlson et al. |
| 9,803,543 B2 | 10/2017 | Werke et al. |
| 9,835,522 B2 | 12/2017 | Chen et al. |
| 9,890,732 B2 | 2/2018 | Younkins et al. |
| 9,926,868 B2 | 3/2018 | Serrano et al. |
| 9,945,313 B2 | 4/2018 | Kotwicki et al. |
| 9,981,652 B2 | 5/2018 | Kim et al. |
| 10,012,161 B2 | 7/2018 | Shost et al. |
| 10,024,289 B2 | 7/2018 | Leamy et al. |
| 10,060,368 B2 | 8/2018 | Pirjaberi et al. |
| 10,138,860 B2 | 11/2018 | Nagashima et al. |
| 10,167,799 B2 | 1/2019 | Serrano et al. |
| 10,196,995 B2 | 2/2019 | Pirjaberi et al. |
| 10,221,786 B2 | 3/2019 | Serrano et al. |
| 10,344,692 B2 | 7/2019 | Nagashima et al. |
| 10,436,133 B2 | 10/2019 | Pirjaberi et al. |
| 10,508,604 B2 | 12/2019 | Pirjaberi et al. |
| 10,549,744 B2 | 2/2020 | Doering |
| 10,578,037 B2 | 3/2020 | Nagashima et al. |
| 10,787,979 B2 | 9/2020 | Pirjaberi et al. |
| 10,830,166 B2 | 11/2020 | Serrano et al. |
| 10,954,877 B2 | 3/2021 | Nagashima et al. |
| 11,136,928 B2 | 10/2021 | Serrano et al. |
| 11,208,964 B2 | 12/2021 | Pirjaberi et al. |
| 2003/0034002 A1 | 2/2003 | Armstrong et al. |
| 2003/0213467 A1 | 11/2003 | Rayl et al. |
| 2004/0012206 A1 | 1/2004 | Wakashiro et al. |
| 2004/0140139 A1 | 7/2004 | Malik |
| 2004/0174124 A1 | 9/2004 | Lee |
| 2004/0189140 A1 | 9/2004 | Fukuda et al. |

(56) References Cited

U.S. PATENT DOCUMENTS

| | | |
|---|---|---|
| 2005/0038576 A1 | 2/2005 | Hara et al. |
| 2005/0051133 A1 | 3/2005 | Persson et al. |
| 2005/0055152 A1 | 3/2005 | Wakashiro et al. |
| 2005/0119805 A1 | 6/2005 | Bischoff |
| 2005/0161023 A1 | 7/2005 | Albertson et al. |
| 2005/0164826 A1 | 7/2005 | Albertson |
| 2005/0189894 A1 | 9/2005 | Komiyama et al. |
| 2005/0261817 A1 | 11/2005 | Koenig et al. |
| 2006/0086546 A1 | 4/2006 | Hu et al. |
| 2006/0173590 A1 | 8/2006 | Zillmer et al. |
| 2006/0234829 A1 | 10/2006 | Berger et al. |
| 2007/0042861 A1 | 2/2007 | Takaoka et al. |
| 2007/0056533 A1 | 3/2007 | Reed et al. |
| 2007/0099749 A1 | 5/2007 | Zillmer et al. |
| 2007/0113541 A1 | 5/2007 | Jankovic |
| 2007/0131196 A1 | 6/2007 | Gibson et al. |
| 2007/0214772 A1 | 9/2007 | England |
| 2007/0219702 A1 | 9/2007 | Kishimoto |
| 2007/0261656 A1 | 11/2007 | Albertson et al. |
| 2008/0078593 A1 | 4/2008 | Ortmann et al. |
| 2008/0154468 A1 | 6/2008 | Berger et al. |
| 2008/0191492 A1 | 8/2008 | Savant et al. |
| 2009/0084618 A1 | 4/2009 | Thompson et al. |
| 2009/0105896 A1 | 4/2009 | Tamai et al. |
| 2009/0105926 A1 | 4/2009 | Choi et al. |
| 2009/0145381 A1 | 6/2009 | Watanabe |
| 2009/0150055 A1 | 6/2009 | Kaiser et al. |
| 2009/0205888 A1 | 8/2009 | Steuernagel et al. |
| 2009/0241911 A1 | 10/2009 | Fox et al. |
| 2010/0010724 A1 | 1/2010 | Tripathi et al. |
| 2010/0050993 A1 | 3/2010 | Zhao et al. |
| 2010/0212632 A1 | 8/2010 | Javaherian et al. |
| 2010/0305797 A1 | 12/2010 | Jiang |
| 2011/0088659 A1 | 4/2011 | Wang et al. |
| 2011/0130902 A1 | 6/2011 | Heisel et al. |
| 2011/0144838 A1 | 6/2011 | Matthews et al. |
| 2011/0153128 A1 | 6/2011 | Wright et al. |
| 2011/0174065 A1 | 7/2011 | Lilienkamp et al. |
| 2011/0276251 A1 | 11/2011 | Kang et al. |
| 2011/0284336 A1 | 11/2011 | Soller et al. |
| 2012/0010792 A1 | 1/2012 | Nedorezov et al. |
| 2012/0031357 A1 | 2/2012 | Ervin et al. |
| 2012/0035793 A1 | 2/2012 | Kang et al. |
| 2012/0073929 A1 | 3/2012 | Grutter et al. |
| 2012/0078456 A1 | 3/2012 | Hakumura et al. |
| 2012/0109495 A1 | 5/2012 | Tripathi et al. |
| 2012/0191316 A1 | 7/2012 | Leone et al. |
| 2012/0221217 A1 | 8/2012 | Sujan et al. |
| 2013/0066502 A1 | 3/2013 | Yuille et al. |
| 2013/0225363 A1 | 8/2013 | Lehmen et al. |
| 2013/0333655 A1 | 12/2013 | Schwenke et al. |
| 2014/0041625 A1 | 2/2014 | Pirjaberi et al. |
| 2014/0041626 A1* | 2/2014 | Wilcutts ............ B60W 10/026 123/350 |
| 2014/0046558 A1 | 2/2014 | Kim |
| 2014/0048023 A1 | 2/2014 | Ervin et al. |
| 2014/0100733 A1* | 4/2014 | Christ ............... B60W 10/06 903/930 |
| 2014/0109720 A1 | 4/2014 | Werner et al. |
| 2014/0148304 A1 | 5/2014 | Pietron et al. |
| 2014/0163839 A1 | 6/2014 | Staley et al. |
| 2014/0172209 A1 | 6/2014 | Ide |
| 2014/0222261 A1 | 8/2014 | Kato |
| 2014/0251282 A1 | 9/2014 | Kotwicki et al. |
| 2014/0288755 A1 | 9/2014 | Murakami |
| 2014/0364273 A1 | 12/2014 | Martin |
| 2014/0366832 A1 | 12/2014 | Tsunoda |
| 2015/0100221 A1 | 4/2015 | Routledge et al. |
| 2015/0260117 A1 | 9/2015 | Shost et al. |
| 2015/0354477 A1* | 12/2015 | Leone ............... F02D 41/0002 123/406.26 |
| 2016/0032869 A1 | 2/2016 | Boyer et al. |
| 2016/0040614 A1 | 2/2016 | Younkins et al. |
| 2016/0053697 A1 | 2/2016 | Pirjaberi et al. |
| 2016/0102620 A1 | 4/2016 | Ervin et al. |
| 2016/0107633 A1 | 4/2016 | Liang et al. |
| 2016/0108798 A1 | 4/2016 | VanDerWege |
| 2016/0201586 A1* | 7/2016 | Serrano ............. F02D 41/0002 701/111 |
| 2016/0222899 A1 | 8/2016 | Glugla |
| 2016/0281618 A1 | 9/2016 | Younkins et al. |
| 2017/0051689 A1 | 2/2017 | Serrano et al. |
| 2017/0089281 A1 | 3/2017 | Ujihara et al. |
| 2017/0130630 A1 | 5/2017 | Younkins et al. |
| 2017/0234253 A1 | 8/2017 | Serrano et al. |
| 2017/0291596 A1 | 10/2017 | Tsukada et al. |
| 2017/0306864 A1 | 10/2017 | Pirjaberi et al. |
| 2017/0321617 A1 | 11/2017 | Kalluri et al. |
| 2017/0342920 A1 | 11/2017 | Pirjaberi et al. |
| 2017/0342921 A1 | 11/2017 | Pirjaberi et al. |
| 2017/0342922 A1 | 11/2017 | Pirjaberi et al. |
| 2017/0370342 A1 | 12/2017 | Nagashima et al. |
| 2018/0202379 A1* | 7/2018 | Nagashima ......... F02D 41/1497 |
| 2018/0230919 A1* | 8/2018 | Nagashima ........... F02D 41/307 |
| 2018/0251116 A1 | 9/2018 | Cho et al. |
| 2018/0257635 A1 | 9/2018 | Meyer et al. |
| 2018/0320615 A1 | 11/2018 | Pirjaberi et al. |
| 2019/0003443 A1 | 1/2019 | Ortiz-Soto et al. |
| 2019/0145329 A1 | 5/2019 | Serrano et al. |
| 2019/0178180 A1 | 6/2019 | Pirjaberi et al. |
| 2019/0263382 A1 | 8/2019 | Parsels et al. |
| 2020/0158044 A1* | 5/2020 | Nagashima ............ F02D 13/04 |
| 2020/0386176 A1 | 12/2020 | Pirjaberi et al. |
| 2021/0071605 A1 | 3/2021 | Serrano et al. |
| 2021/0396189 A1 | 12/2021 | Serrano et al. |
| 2022/0074361 A1 | 3/2022 | Pirjaberi et al. |

FOREIGN PATENT DOCUMENTS

| | | |
|---|---|---|
| CN | 102233876 | 5/2014 |
| CN | 102817722 | 5/2015 |
| CN | 103332193 | 11/2015 |
| CN | 103711594 | 6/2016 |
| CN | 103711595 | 1/2017 |
| CN | 104204473 | 2/2017 |
| DE | 19532163 | 3/1997 |
| DE | 19532164 | 3/1997 |
| DE | 10210246 | 9/2002 |
| DE | 11 2013 004 033 | 5/2015 |
| JP | H09222034 | 8/1997 |
| JP | 11-022504 | 1/1999 |
| JP | 2001355480 | 12/2001 |
| JP | 2014532145 | 12/2019 |
| KR | 2001-0058902 | 7/2001 |
| WO | WO 2010/006311 | 1/2010 |
| WO | WO 2011/085383 | 7/2011 |
| WO | WO 2014/028344 | 2/2014 |

* cited by examiner

NOISE, VIBRATION AND HARSHNESS REDUCTION IN A SKIP FIRE ENGINE CONTROL SYSTEM

FIELD OF THE INVENTION

The present invention relates to a skip fire engine control system for an internal combustion engine. More specifically, the present invention relates to arrangements and methods for reducing noise, vibration and harshness (NVH) using a smoothing torque that is applied to the powertrain.

BACKGROUND

Most vehicles in operation today are powered by internal combustion (IC) engines. Internal combustion engines typically have multiple cylinders or other working chambers where combustion occurs. The power generated by the engine depends on the amount of fuel and air that is delivered to each working chamber and the engine speed.

The combustion process and the firing of cylinders can introduce unwanted noise, vibration and harshness (NVH). For example, the engine can transfer vibration to the body of the vehicle, where it may be perceived by vehicle occupants. Sounds may also be transmitted through the chassis into the cabin of the vehicle. Under certain operating conditions, the firing of cylinders generates undesirable acoustic effects through the exhaust system and tailpipe. Vehicle occupants may thus experience undesirable NVH from structurally transmitted vibrations or sounds transmitted through the air. Thus, there are ongoing efforts to reduce the amount of NVH generated by internal combustion engines.

A variety of methods and arrangements for reducing noise, vibration and harshness (NVH) in a skip fire engine control system are described In non-exclusive embodiments, a vehicle and a method for operating a vehicle to reduce NVH while the vehicle is idling and the internal combustion engine is cold is disclosed. This embodiment involves detecting if an operating temperature of an internal combustion engine of the vehicle is below a threshold temperature, ascertaining if the vehicle is idling when the operating temperature of the internal combustion engine is below the threshold temperature, operating the internal combustion engine in a skip fire mode such that some firing opportunities of cylinders of the internal combustion engine are fired while other firing opportunities of the cylinders are skipped while the vehicle is idling and the internal combustion engine is below the threshold temperature, and applying a smoothing torque to a powertrain of the vehicle while the internal combustion engine is operating in the skip fire manner, the vehicle is idling and the operating temperature of the internal combustion engine is below the threshold temperature.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

Figure 1:
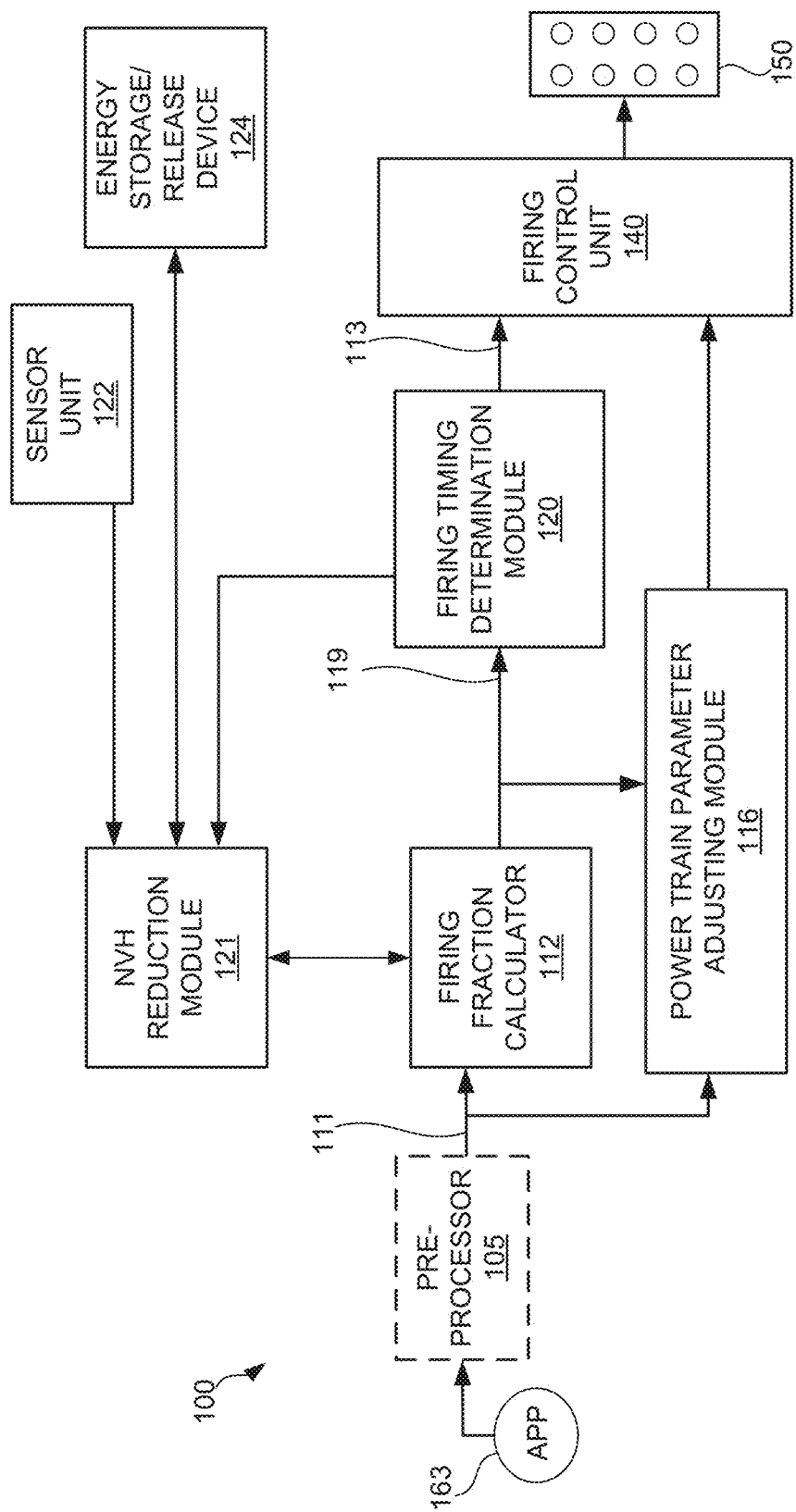
FIG. 1 is a block diagram of a powertrain controller in a skip fire engine control system according to one embodiment of the present invention.

The present invention relates to a skip fire engine control system. More specifically, the present invention involves methods and arrangements for using a smoothing torque to reduce noise, vibration and harshness (NVH) in a skip fire engine control system.

Skip fire engine control contemplates selectively skipping the firing of certain cylinders during selected firing opportunities. Thus, for example, a particular cylinder may be fired during one firing opportunity and then may be skipped during the next firing opportunity and then selectively skipped or fired during the next. This is contrasted with conventional variable displacement engine operation in which a fixed set of the cylinders are deactivated during certain low-load operating conditions.

Skip fire engine control can offer various advantages, including substantial improvements in fuel economy. One challenge, however, with skip fire engine control is noise, vibration and harshness. More specifically, there are particular firing sequences or firing fractions that generate substantial amounts of NVH. Such NVH is undesirable, since it can be felt by vehicle occupants.

One approach to dealing with such problems is to not use particular firing fractions or firing sequences that are known to produce unacceptable NVH levels. Instead, other firing fractions or firing sequences are used and the cylinder output is adjusted accordingly (e.g., by adjusting the manifold absolute pressure, spark advance, etc.) so that the desired engine output is delivered. Various approaches of this kind are described in co-assigned U.S. patent application Ser. No. 13/654,244, which is incorporated herein in its entirety for all purposes.

This application describes another approach for dealing with NVH. Various implementations involve generating a smoothing torque that is applied to a powertrain of a vehicle. The smoothing torque is any torque that is applied to help cancel out or reduce a variation in torque generated by an engine. The smoothing torque can be generated by any suitable energy storage/capture/release device. One example would be an electric motor/generator with a battery and/or capacitor to store and release energy. Alternatively any system or device that stores and captures/releases energy mechanically, pneumatically or hydraulically may be used. For example, a flywheel with a variable mechanical coupling, or a high pressure fluid reservoir with valves controlling fluid flow to and from a turbine or similar device may be used to capture/release energy from a powertrain. The smoothing torque is applied in a manner such that noise and vibration generated by the skip fire firing sequence are at least partially reduced or canceled out.

In various approaches, the above smoothing torque system is applied selectively. That is, many firing fractions and firing sequences that deliver a desired torque generate acceptable levels of NVH, and thus the smoothing torque need not be applied in those circumstances. In other circumstances, a suitable firing fraction or firing sequence may generate undesirable levels of NVH, but the energy expenditure, or equivalently energy costs, involved in mitigating the NVH may be too great. Thus, another firing fraction or firing sequence is used to deliver the desired engine output. In still other circumstances, the use of a smoothing torque may allow the use of firing fractions or firing sequence that were otherwise unacceptable due to their associated NVH levels, and result in energy savings rather than losses. In various embodiments, the smoothing torque system is arranged to analyze the energy costs of the available options and select the most fuel efficient approach that also brings NVH to acceptable levels.

Referring initially to FIG. 1, a powertrain controller 100 according to a particular embodiment of the present invention will be described. The powertrain controller 100 includes a firing fraction calculator 112, a firing timing determination module 120, a NVH reduction module 121, a power train parameter adjustment module 116, a sensor unit 122 and a firing control unit 140. The firing fraction calculator 112, the firing timing determination module 120 and the NVH reduction module 121 coordinate their operations to determine a suitable operational firing fraction and skip fire firing sequence for the engine. Depending on the operational firing fraction, they may also determine a suitable smoothing torque to reduce NVH generated by the firing sequence.

The firing fraction calculator 112 receives a torque request signal 111 based on the current accelerator pedal position (APP), engine speed and other inputs. The torque request signal may be directed from the APP 163 through an optional pre-processor 105 before reaching the firing fraction calculator 112. The torque request signal 111, which indicates a request for a desired engine output, may be received or derived from an accelerator pedal position sensor or other suitable sources, such as a cruise controller, a torque calculator, an ECU, etc. An optional pre-processor 105 may modify the accelerator pedal signal prior to delivery to the firing fraction calculator 112. However, it should be appreciated that in other implementations, the accelerator pedal position sensor may communicate directly with the firing fraction calculator 112.

Based on the torque request signal 111, the firing fraction calculator 112 determines a skip fire firing fraction that would be appropriate to deliver the desired torque under selected engine operations and that has acceptable NVH characteristics (with or without use of a smoothing torque). Each firing fraction 112 is indicative of the fraction or percentage of firings under the current (or directed) operating conditions that are required to deliver the desired output. In some preferred embodiments, the firing fraction may be determined based on the percentage of optimized firings that are required to deliver the driver requested engine torque (e.g., when the cylinders are firing at an operating point substantially optimized for fuel efficiency). However, in other instances, different level reference firings, firings optimized for factors other than fuel efficiency, the current engine settings, etc. may be used in determining the firing fraction. In various embodiments, the firing fraction is selected from a set or library of predetermined firing fractions.

The firing fraction determination process may take into account a variety of factors, including NVH, fuel efficiency and the desired torque. In some situations, for example, there is a particular firing fraction that delivers a desired torque in the most fuel efficient manner, given the current engine speed (e.g., using optimized firings.) If that firing fraction is available for use by the firing fraction calculator and also is associated with acceptable NVH levels, the firing fraction calculator 112 selects that firing fraction and transmits it to the firing timing determination module 120, so that a suitable operational firing sequence can be generated based on the firing fraction. The firing fraction calculator 112 also indicates to the NVH reduction module 121 that no NVH mitigation is needed, and thus the energy/storage release device 124 does not apply any smoothing torque to the powertrain while that sequence is used to operate the engine 150.

If the above firing fraction is instead known to generate unacceptable levels of NVH, then the firing fraction calculator may nevertheless select that firing fraction as the operational firing fraction. Such a selection is based on a determination that the NVH can be reduced to acceptable levels by applying a suitable smoothing torque to the powertrain. The selection is also based on the determination that there are no other more fuel efficient firing fraction alternatives, even when the energy costs associated with the NVH mitigation are taken into account. In this case, the firing fraction calculator 112 transmits the selected operational firing fraction to the firing timing determination module 120, so that a suitable operational firing sequence can be generated based on the firing fraction. The firing fraction calculator also indicates to the NVH reduction module that mitigation of the NVH is required. As a result, the NVH reduction module operates the energy storage/release device 124 to apply a suitable amount of smoothing torque on the powertrain to reduce the NVH generated by the firing sequence.

In still other circumstances, the firing fraction calculator 112 may select an operational firing fraction that is less ideally suited to deliver the desired torque i.e., a firing fraction that is better suited to deliver an amount of torque that is different from the desired torque, but has acceptable NVH characteristics. Thus, the cylinder output must be adjusted (e.g., by adjusting MAP, spark advance and other engine parameters) so that the desired torque is delivered.

However, the operational firing fraction is nevertheless more fuel efficient than the other alternatives, which may include a firing fraction with poor NVH characteristics where NVH mitigation is not possible or ends up consuming too much energy.

The firing fraction calculator 112 is arranged to store and/or access data to help it make the above determinations and energy efficiency comparisons. Any suitable data structure or algorithm may be used to make the determinations. In some embodiments, for example, the firing fraction calculator 112 uses a lookup table to determine a suitable operational firing fraction and to determine whether a smoothing torque should be applied. In still other embodiments, the firing fraction calculator makes such determinations by dynamically calculating and comparing the energy efficiency associated with different candidate firing fractions and/or sequences. Some of these approaches will be described in greater detail later in the application.

After selecting a suitable operational firing fraction, the firing fraction calculator 112 transmits the firing fraction 119 to the firing timing determination module 120. The firing timing determination module 120 is arranged to issue a sequence of firing commands (e.g., drive pulse signal 113) that cause the engine 150 to deliver the percentage of firings dictated by a commanded firing fraction 119. In some implementations, for example, the firing timing determination module 120 generates a bit stream, in which each 0 indicates a skip and each 1 indicates a fire for the current cylinder firing opportunity.

The firing timing determining module 120 may generate the firing sequence in a wide variety of ways. By way of example, sigma delta convertors work well as the firing timing determining module 120. In still other embodiments, the firing timing determination module selects a suitable firing sequence from a firing sequence library based on the received firing fraction.

If it has been determined that there is no need to mitigate NVH generated by the firing sequence, the sequence of firing commands (sometimes referred to as drive pulse signal 113) outputted by the firing timing determination module 120 may be passed to the firing control unit 140 which actuates and commands the actual cylinder firings. No smoothing torque is applied to the powertrain by the energy storage/release device 124 during the execution of the firing sequence at the engine 150.

On the other hand, if it has been determined that the firing sequence requires mitigation, the firing fraction calculator 112 and/or the firing timing determination module 120 transmit the firing fraction and/or firing sequence to the NVH reduction module 121 before the firing sequence is used to operate the engine. Based on these inputs, the NVH reduction module 121 is arranged to determine a suitable smoothing torque that would bring the NVH generated by the firing sequence to acceptable levels. In various embodiments, the smoothing torque takes the form of one or more substantially sinusoid torque waveforms that are applied to the powertrain and that oppose particular variations in the torque generated by the skip fire firing sequence. The argument of the sinusoidal torque waveform may be based on the crank angle of the engine. That is, the smoothing torque can be described as smoothing torque=sin (f*θ+φ) where θ is the crank angle, φ is the phase and f=N/4 (for a V8 engine) where N is the denominator of the firing fraction level.

In various embodiments, the smoothing torque waveform is applied to the powertrain by the energy storage/release device 124. The smoothing torque involves sequentially adding torque to and then subtracting torque from the powertrain. The timing, magnitude and pattern of the smoothing torque may be based on a variety of factors, including but not limited to the skip fire firing sequence, the engine speed, and battery charge or charging level in an alternative storage device, i.e. capacitor, and the current cylinder number.

It should be noted that various implementations of the smoothing torque as described here differ from some prior art systems that used an electric motor to fill in missing torque pulses from a skipped cylinder. Such a system requires delivering high bandwidth and amplitude torque pulses from the energy storage/release device 124. Various implementations of the present invention do not attempt explicitly to fill in a torque hole created by a skipped firing opportunity. Rather, such implementations consider the overall torque signature generated by a particular firing fraction or firing sequence. In these implementations, the control electronics seek to counter the torque variation associated with one or more harmonics of the torque signature. Advantageously, this type of control algorithm requires a lower bandwidth energy storage/release device 124, since the control is not trying to cancel or mimic the high bandwidth components of the torque spike associated with a firing cylinder. Likewise, energy storage/release device 124 can deliver lower smoothing torque amplitudes, since the system is not trying to mimic a torque spike associated with a firing cylinder. Both the lower bandwidth and amplitude makes the hardware associated with the energy storage/release device 124 cheaper and easier to implement. A further advantage of this method is that lower frequency harmonics are felt more strongly by vehicle occupants, thus maximizing the reduction in sensed vibration for a given amount of smoothing torque.

Any suitable algorithm or technique may be used to generate the smoothing torque waveform. In some embodiments, for example, the NVH reduction module 121 receives a firing sequence from the firing timing determination module 120, which will be later used to operate the engine 150. The NVH reduction module 121 determines variations in the engine torque that would be generated by the firing sequence. The variations in the engine torque are responsible for the generation of NVH. The smoothing torque includes variations that oppose and help cancel out one or more types of variations in the engine torque.

The characteristics of the smoothing torque may vary widely, depending on the needs of a particular application. Consider an example process, similar to what was described above, in which the firing fraction calculator 112 selects an operational firing fraction that is known to generate unacceptable amounts of NVH. Thus, the NVH must be mitigated. Accordingly, the firing timing determination 120 generates a skip fire firing sequence based on the operational firing fraction, which is transmitted to the NVH reduction module 121 for analysis.

The NVH reduction module 121 determines an expected engine torque based on the skip fire firing sequence, engine speed, firing fraction and/or any other suitable parameter. In some implementations, this engine torque is understood to include a fixed component (i.e., a DC term) and a variable component that can be represented by multiple harmonic sinusoids, including a first harmonic (fundamental frequency) and other harmonics. The fixed DC term propels the vehicle and the harmonics are the unavoidable result of the variation in torque generated by an internal combustion engine as its cylinders move through the various strokes of a combustion cycle. These harmonic sinusoids or variations in the engine torque are considered to be the source of the NVH. The NVH reduction module 121 determines a smoothing torque, which is applied to the powertrain using a particular pattern or sequence. In various embodiments, the characteristics of the smoothing torque pattern or sequence (e.g., frequency, magnitude and phase) are designed to at least partially counter or oppose a selected set of one or more of the harmonic sinusoids.

Figure 7:
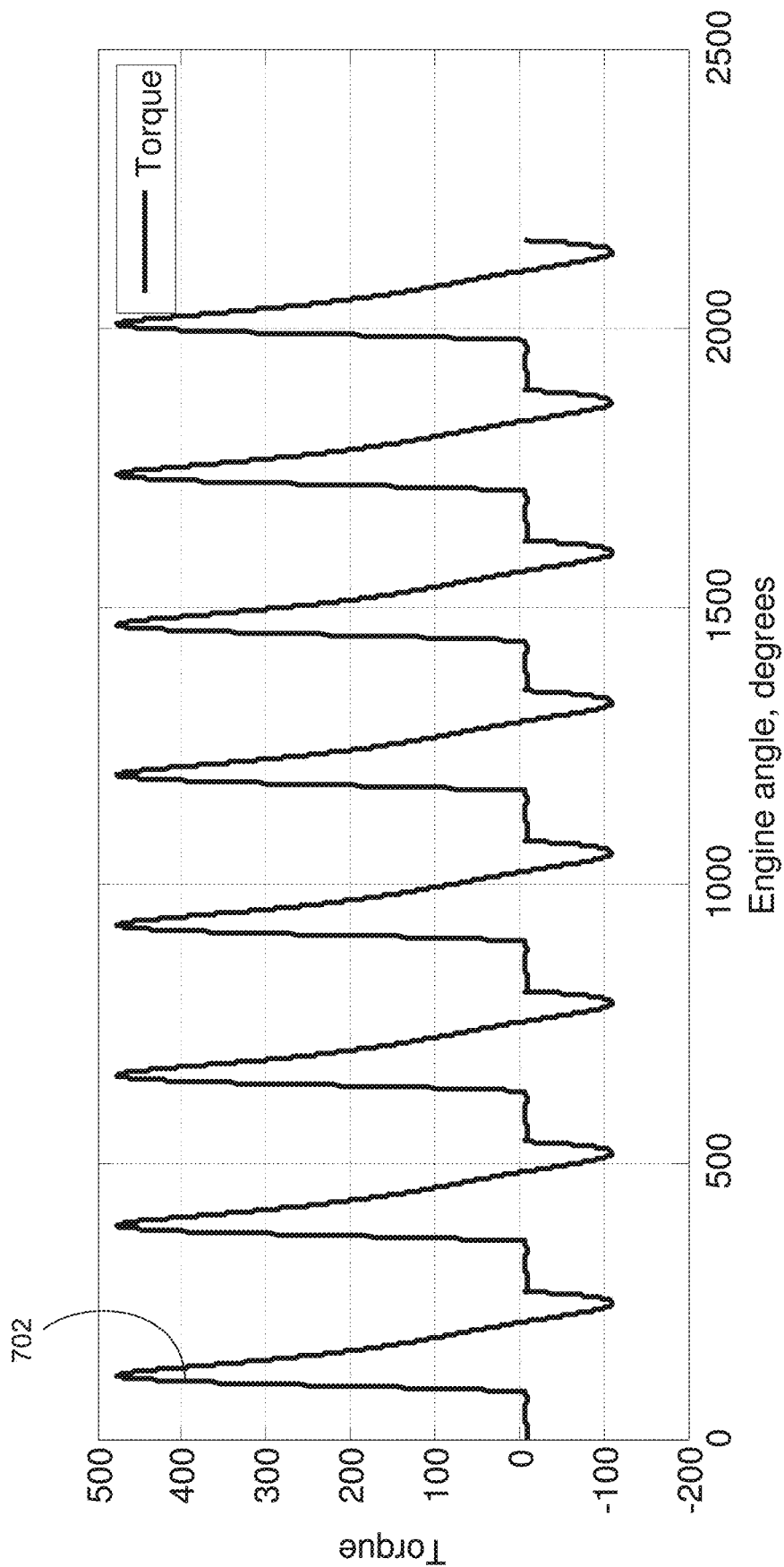
FIG. 7 is a diagram of an engine torque waveform according to one embodiment of the present invention.

An example of this concept is shown in FIGS. 7-11. FIG. 7 is a graph illustrating engine torque (N*m) applied to the crankshaft/powertrain as a function of engine angle. That is, the graph indicates a waveform 702 that represents the engine torque generated by a sample skip fire firing sequence. In this example, the average torque is approximately 87 N*m. This average torque is the fixed component of the engine torque i.e., the DC term. Using the techniques of Fourier analysis, the engine torque waveform 702 can be expressed as the sum of this fixed component and various harmonics each having a fixed amplitude. (i.e., multiple harmonics including a first harmonic, second harmonic . . . tenth harmonic, etc.)

Figure 8:
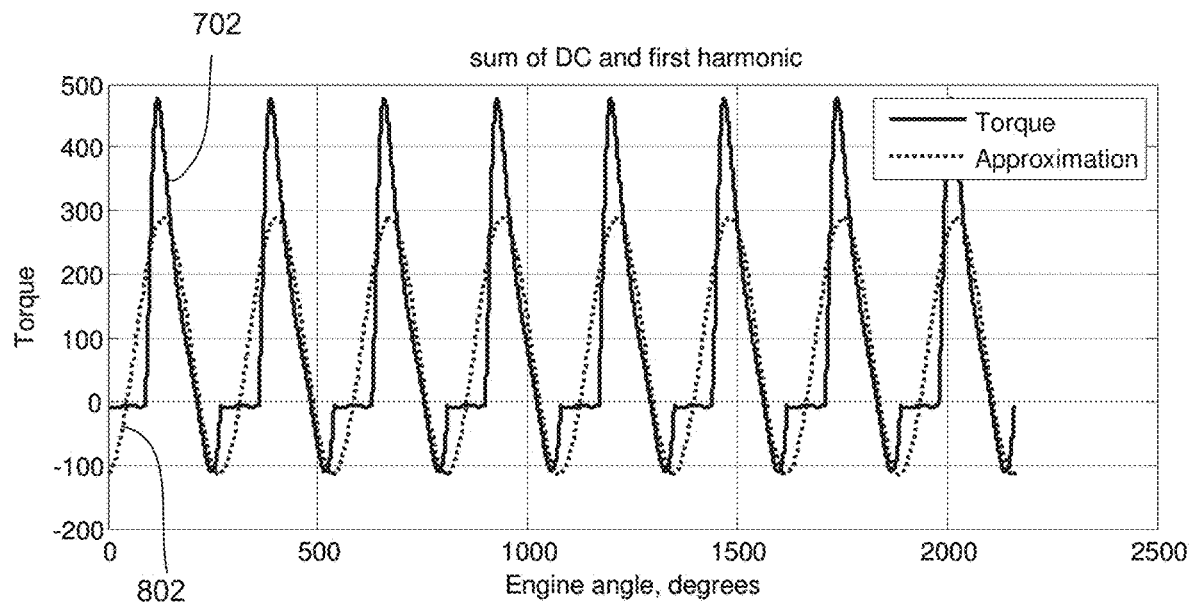
FIG. 8 is an example diagram of a first harmonic superimposed over the engine torque waveform illustrated in FIG. 7.
Figure 9:
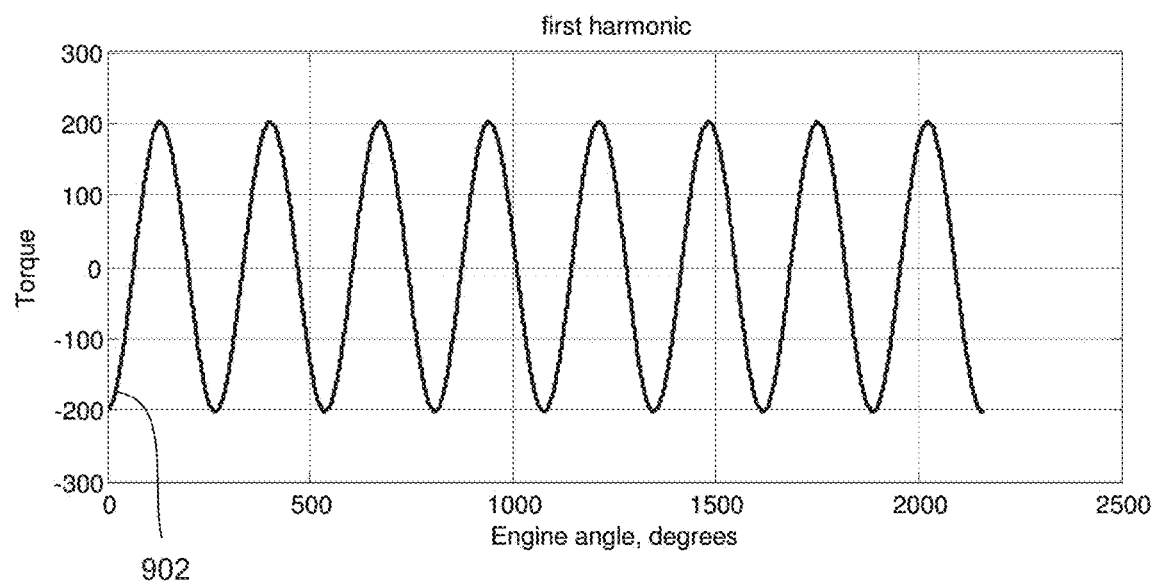
FIG. 9 is an example diagram of a first harmonic.

An example DC plus first harmonic waveform 802 is shown in FIG. 8, superimposed over the engine torque waveform 702. The offset first harmonic waveform 802, has a frequency that matches the fundamental frequency of the waveform 702. As can be seen in FIG. 8, offset first harmonic waveform 802 matches a significant fraction of the engine torque waveform 702. The first harmonic component can be isolated by subtracting the average torque (e.g., DC offset of 87 N*m) from waveform 802. This results in first harmonic waveform 902 of FIG. 9. In various embodiments, a smoothing torque waveform is generated to counter the waveform 902 i.e., to subtract torque from the powertrain when the waveform 902 adds torque to the powertrain, and to add torque to the powertrain when the waveform 902 subtracts torque from the powertrain.

Various approaches involve a smoothing torque that has characteristics (e.g., frequency) that are generally identical or substantially similar to those of a selected set of one or more of the harmonic sinusoids, except that the amplitude may be different and the phase is shifted (e.g., 180°) so that the smoothing torque reduces or cancels the selected harmonic sinusoid(s). In some embodiments, the smoothing torque is arranged to only oppose, be based on and/or have the same frequency as the first harmonic. That is, in various embodiments, the smoothing torque is not based on, has a different frequency from and/or does not oppose the other harmonics in the expected engine torque. The inventors have determined that in various applications, only one or a few harmonic sinusoids need to be cancelled or reduced in order to bring NVH to an acceptable level. In the example case shown in FIGS. 7-9 the smoothing torque can simply be configured to cancel or reduce to an acceptable level the first harmonic waveform 902. The smoothing torque may thus have the same frequency and amplitude as the first harmonic waveform 902, but may simply be offset in phase by 180 degrees. In still other embodiments, the smoothing torque takes into account and opposes multiple harmonics (e.g., the first harmonic and one or more other harmonics, etc.)

In further embodiments a DC term may be added to the smoothing torque. If the DC term is adequately large, then the smoothing torque will be uniformly in one direction; this may eliminate or reduce the impact of any non-linear behavior (e.g. dead-zone, lash, etc) arising when an energy storage/release device crosses zero net delivered torque. The DC term can be in either direction, i.e. the energy storage/release device can store energy from the powertrain or release energy to the powertrain. The DC term can be zero. The magnitude and sign of the DC can depend on a number of factors including battery or capacitor charge level, torque demand, or other operating characteristic.

Figure 10:
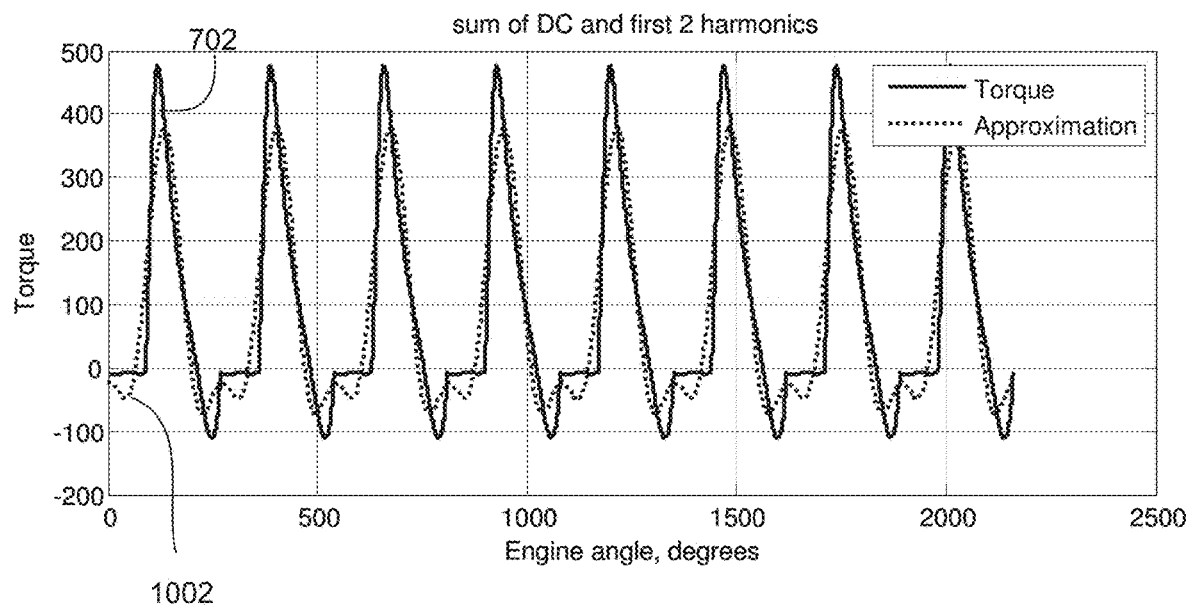
FIG. 10 is an example diagram of a waveform including the first and second harmonics superimposed over the engine torque waveform illustrated in FIG. 7.
Figure 11:
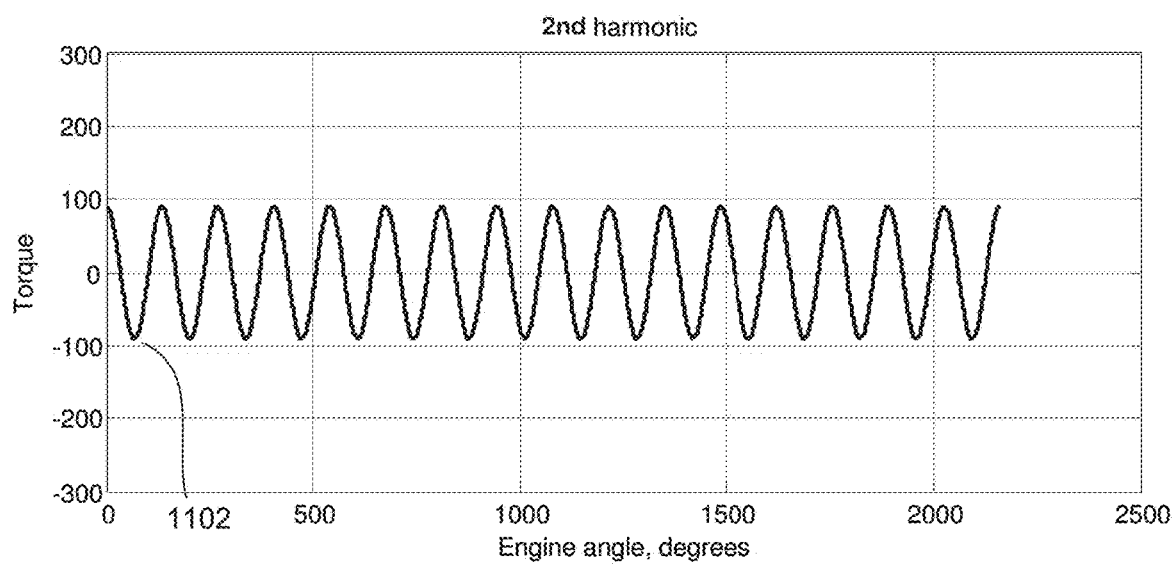
FIG. 11 is an example diagram of a second harmonic.

FIG. 10 illustrates a constant term and two harmonics (i.e., the first and second harmonic) represented by waveform 1002 being isolated and superimposed over the example engine torque waveform 702. As can be seen by comparing FIGS. 8 and 10, the two harmonics, when combined, even better match the overall variation in the engine torque waveform 702 than was the case for the offset first harmonic alone in FIG. 8. FIG. 11 illustrates a second harmonic waveform 1102, which represents the second harmonic after the DC and first harmonic terms have been removed. As can be seen by comparing FIGS. 9 and 11, the amplitude of the first harmonic waveform 902 is substantially greater than the amplitude of the second harmonic waveform 1102. That is, the engine torque waveform 702 has a larger first harmonic component than second harmonic component. The larger first harmonic component will generally generate more undesirable NVH and thus control algorithms may focus on cancelling or reducing this harmonic component. In various applications, the smoothing torque is arranged to oppose only the first harmonic (e.g., waveform 902 of FIG. 9), and not any other harmonics. It has been determined that in some designs, this simplifies calculation and implementation of the smoothing torque and nevertheless is sufficient to bring NVH down to acceptable levels. In still other embodiments, the smoothing torque is arranged to cancel or oppose multiple harmonics (e.g., a composite waveform including waveforms 902 and 1102). Cancelling higher harmonics may be advantageous in reducing acoustic noise arising from the induced vibration. For example, the first and some harmonic other than the second may be substantially cancelled. Specifically harmonics that are in the vicinity of the cabin boom frequency may be advantageously substantially cancelled or reduced.

The magnitude (e.g., amplitude) of the smoothing torque may vary, depending on different conditions and applications. In various embodiments, for example, the magnitude of the smoothing torque is substantially lower than the magnitude of the engine generated harmonic sinusoid(s) that it opposes. In these embodiments, the magnitude of the smoothing torque is arranged to reduce, not eliminate engine NVH and to bring the NVH below a predefined level that is determined to be acceptable to vehicle occupants. What defines this predefined NVH level may vary between different engine and vehicle designs. In various embodiments, user testing is performed to determine the acceptable level of NVH. Additionally, this predefined level of acceptable NVH may also be adjusted dynamically based on a variety of conditions, such as accelerator pedal position, the rate of change in the accelerator pedal position, road conditions, operating gear, vehicle speed, cabin noise level, presence of engine idle and any other suitable parameter. Such conditions may be detected by one or more suitable sensors.

In some implementations, the smoothing torque is also adjusted based on feedback received from sensor unit 122. Sensor unit 122 includes one or more sensors that may detect a variety of engine parameters, including but not limited to crankshaft speed/acceleration, accelerometer data, vibration, etc. By way of example, accelerometers may be positioned at a seat rail, adjacent to, and/or inside an ECU in order to detect vibrations felt by vehicle occupants. Based on the feedback received from the sensor unit 122, the smoothing torque is dynamically adjusted. By way of example, the timing (phase) and magnitude of the smoothing torque sequence may be changed based on the sensor input. It should be appreciated that the above sensor feedback is not required, and that in various embodiments the smoothing torque generation system is a feed forward system.

Once the NVH reduction module prepares a suitable smoothing torque, the NVH reduction module operates the energy storage/release device 124 to apply the smoothing torque to the powertrain. The application of the smoothing torque is coordinated with the execution of the corresponding firing sequence at the engine 120. As a result, the smoothing torque opposes particular variations in the engine torque, and the NVH generated by the skip fire firing sequence is reduced.

In the illustrated embodiment, an optional power train parameter adjusting module 116 is provided that cooperates with the firing fraction calculator 112. The power train parameter adjusting module 116 directs the firing control unit 140 to set selected power train parameters appropriately to insure that the actual engine output substantially equals the requested engine output at the commanded firing fraction. By way of example, the power train parameter adjusting module 116 may be responsible for determining the desired mass air charge (MAC), sparking timing, and valve timing and/or other engine settings that are desirable to help ensure that the actual engine output matches the requested engine output. Of course, in other embodiments, the power train parameter adjusting module may be arranged to directly control various engine settings.

The firing fraction calculator 112, the firing timing determination module 120, the NVH reduction module 121, the power train parameter adjusting module 116, the sensor unit 122 and the other illustrated components of FIG. 1 may take a wide variety of different forms and their functionalities may alternatively be incorporated into an ECU, or provided by other more integrated components, by groups of subcomponents or using a wide variety of alternative approaches. In various alternative implementations, these functional blocks may be accomplished algorithmically using a microprocessor, ECU or other computation device, using analog or digital components, using programmable logic, using combinations of the foregoing and/or in any other suitable manner.

Although not required in all implementations, in some implementations determination of an appropriate firing fraction and/or the smoothing torque (i.e., a determination as to whether smoothing torque will be used and what the smoothing torque will be) may be made on a firing opportunity by firing opportunity basis. That is, the currently desired firing fraction and/or smoothing torque can be re-determined before each firing opportunity based on the accelerator pedal position or other operating parameters. This allows the controller 100 to be particularly responsive to changing demands (e.g., change in the manifold absolute pressure or other engine parameters) while maintaining the benefits of skip fire operation. In other implementations the torque generated while changing firing fractions can be predicted and a control system based on adaptive filters or model predictive control may be used to improve NVH.

One example where firing opportunity by firing opportunity control is advantageous is when the desired firing fraction changes. A particular example is if the firing fraction changes from ½ to 1. In this example, the MAP needs to be reduced to generate the right level of torque, but this is slow, i.e. MAP has limited ability to change on a firing opportunity by firing opportunity basis. One prior art solution to this problem, such as described in U.S. patent application Ser. No. 13/654,244, is to adjust the firing fraction at a relatively low speed to match the expected change in MAP. By constantly recalculating and delivering an appropriate smoothing torque, the NVH reduction module can remove excessive torque resulting from a too-high MAP, allowing a faster transition.

In some embodiments, the smoothing torque may be determined using a precalculated future firing sequence in a short-horizon optimal control computation. This control method is particularly useful when the firing sequence is non-repeating, such as during a transition between firing fraction levels. Herein short-horizon may refer to the firing decisions that have been made, but not yet implemented. This may be in the range of 4 to 20 firing opportunities, but could be more or less. Since these decisions are known before they are implemented the smoothing torque can be precalculated. The smoothing torque may include both negative and positive torques in order to obtain optimum NVH-fuel economy tradeoff, subject to motor/generator and energy storage device constraints. Motor/generator constraints may include maximum allowable torque and power levels. Energy storage constraints may include current energy storage level and well as the maximum power transfer from the energy storage device.

Figure 2:
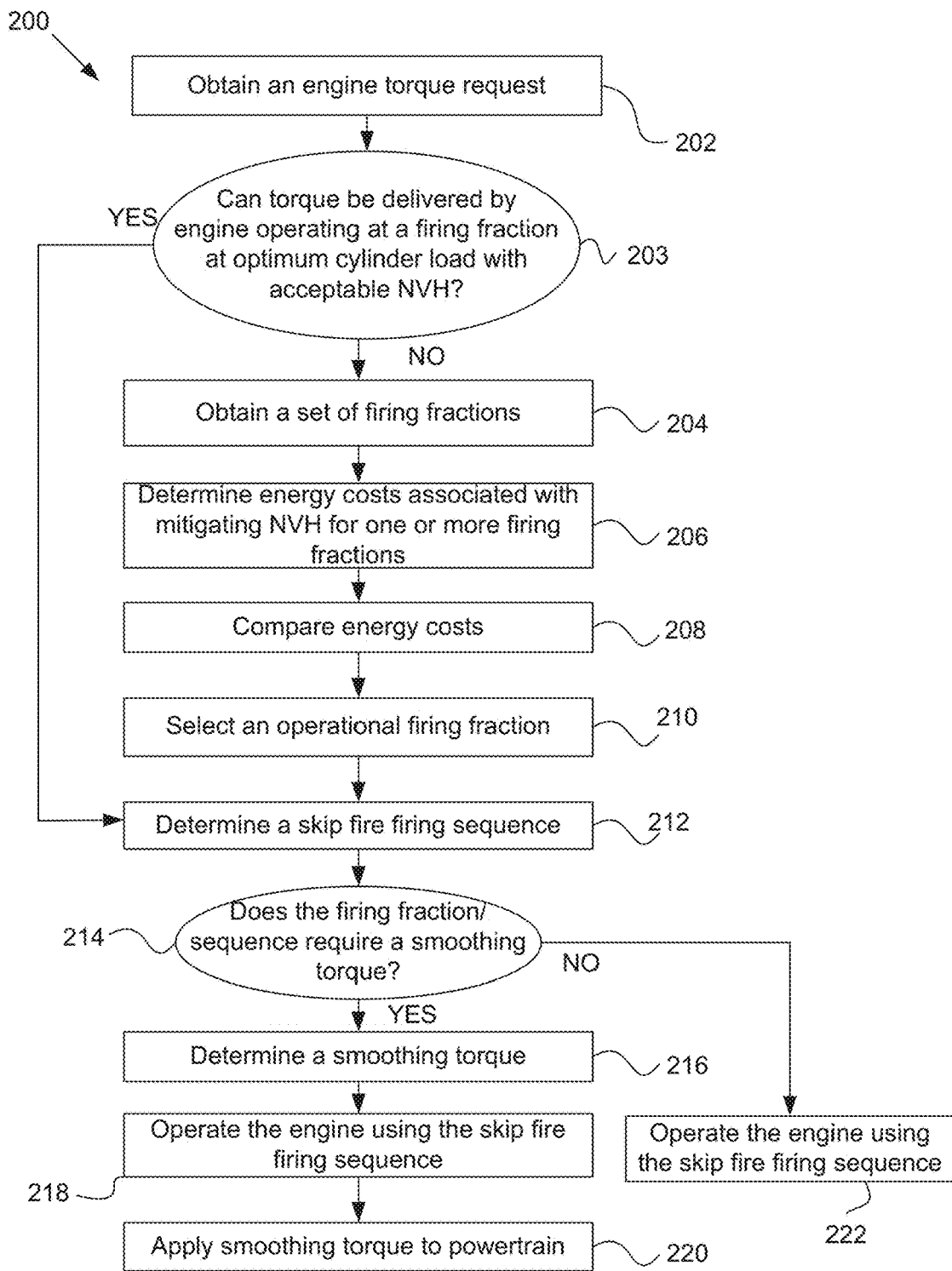
FIG. 2 is a flow chart that diagrammatically illustrates a method for reducing noise, vibration and harshness (NVH) in a skip fire engine control system according to one embodiment of the present invention.

Referring next to FIG. 2, a method 200 for determining a smoothing torque according to a particular embodiment of the present invention will be described. Initially, at step 202, an engine torque request is received. In various implementations, the firing fraction calculator 112 determines a desired engine torque based on the accelerator pedal position, engine speed, a cruise controller setting and any other suitable engine parameter.

Steps 203, 204, 206 and 208 relate to a process for evaluating different candidate firing fractions to select an operational firing fraction that delivers the desired torque and has acceptable NVH characteristics, either with or without any mitigation. In some embodiments, the powertrain controller performs these steps as appropriate when an operational firing fraction needs to be selected. In other embodiments, however, the evaluating of different candidate firing fractions is instead incorporated into an algorithm, lookup table or any other suitable decision making mechanism. That is, rather than dynamically comparing different candidate firing fractions on the fly, the powertrain controller instead may consult a table or other mechanism that directly generates the operational firing fraction based on various inputs. In that case, the method proceeds directly to step 210.

Returning to step 203 of FIG. 2, after a desired torque level is obtained, the firing fraction calculator 112 determines whether an available firing fraction with acceptable NVH characteristics can deliver the desired torque while operating at optimum cylinder load e.g., the cylinder load which maximizes fuel economy. In some embodiments, for example, the firing fraction calculator 112 stores data indicating a set of such firing fractions that are known to have acceptable NVH characteristics while operating under optimum cylinder load under certain operational conditions. It should be appreciated that which firing fractions produce acceptable NVH is a function of the engine speed and transmission gear as described in co-pending U.S. patent application Ser. Nos. 13/654,244 and 13/963,686, which are incorporated herein in their entirety for all purposes. If one of these firing fractions can deliver the desired torque, then the method proceeds to step 212 and that firing fraction becomes the operational firing fraction.

If the firing fraction calculator 112 determines that there is no firing fraction with acceptable NVH characteristics that can deliver the desired torque at optimum cylinder load, then the method proceeds to step 204. At step 204, the firing fraction calculator obtains a set of candidate firing fractions. The set of firing fractions may include two types of firing fractions. One type involves one or more candidate firing fractions with acceptable NVH characteristics that deliver the desired torque, but only if the cylinder output is adjusted to a non-optimal load, as discussed in U.S. patent application Ser. No. 13/654,244, which is incorporated herein by reference in its entirety for all purposes. For the purpose of this application, such a firing fraction is referred to as a "low NVH firing fraction." The other type of firing fraction involves one or more candidate firing fractions that can deliver the desired torque with less or minimal cylinder load adjustment, but the NVH associated with such firing fractions may be unacceptable without mitigation. For the purpose of this application, such a firing fraction is referred to as a "high NVH firing fraction."

At step 206, energy costs associated with mitigating NVH for the high NVH firing fraction(s) is/are determined. This may be performed in a wide variety of ways. One example approach is described below.

In this example, the firing timing determination module 120 generates a candidate skip fire firing sequence based on the candidate high NVH firing fraction. The torque generated by the skip fire firing sequence and firing fraction can be modeled as a periodic waveform. That waveform, in turn can, be represented as a Fourier series:

$$Tq(t) = a_0 + \sum_{n=1}^{\infty} \left( a_n \cos \frac{n 2\pi t}{T} + \varphi_n \right) \quad (1)$$

where $Tq(t)$ is the torque as a function of time, $a_0$ is the average torque (DC term), $a_n$ is the amplitude associated with the $n^{th}$ harmonic component, $T$ is the period of the first harmonic (fundamental frequency), and $\varphi_n$ is the phase of the $n^{th}$ harmonic component.

Human perception of NVH varies with frequency. Typically lower frequencies, below approximately 8 Hz, are perceived as more annoying than higher frequency oscillations. The relative contribution of each harmonic component to NVH can be defined by a weighting factor, $w_n$. If $w_n$ is the weight of the $n^{th}$ harmonic, total NVH can be determined by taking the RMS value of the product of the weighting functions and the magnitude of the various harmonic frequencies:

$$NVH = \sqrt{\frac{1}{2} \sum_{n=1}^{\infty} w_n^2 a_n^2} \quad (2)$$

If an energy storage/release device 124 is included in the powertrain, Eq. 2 needs to be modified to include a smoothing torque applied to the powertrain by the energy storage/release device 124. The smoothing torque can be expressed by a Fourier expansion similar to Eq. 1 where the $n^{th}$ harmonic component has a magnitude $e_n$. Equation 3 below represents the NVH including the effect of the smoothing torque, assuming the phase of each harmonic term of the smoothing torque is shifted by 180 degrees from the engine torque, $$NVH = \sqrt{\frac{1}{2} \sum_{n=1}^{\infty} w_n^2 (a_n - e_n)^2} \quad (3)$$

The power required to create the above mitigating waveform or smoothing torque is as follows:

$$P = (1 - \eta) \sqrt{\frac{1}{2} \sum_{n=1}^{\infty} (e_n)^2} \quad (4)$$

here $\eta$ is the round trip efficiency of the energy storage/release device. Put another way, Equation 4 indicates the amount of energy required by the energy storage/release device 124 to generate the corresponding smoothing torque. Typical values for $\eta$ are 0.7 to 0.9 for an energy storage/release device based on a motor/generator and capacitive energy storage. Other energy storage/release devices may have higher or lower efficiencies.

It should be appreciated that Eq. 4 assumes that round trip efficiency is constant for all harmonics and that a single energy source/sink is used. Generally these are valid assumptions as typically an internal combustion engine is the ultimate source of all energy to drive the vehicle and only a single energy storage/release device exists within the vehicle. While this is generally the case, there are vehicle architectures where this may not be true. For example, plug in hybrids obtain energy from the electrical grid. Likewise vehicles with regenerative braking may store energy in an energy storage/release device independent of the internal combustion engine. In these cases a supervisory module can access the relative costs of energy from different sources and use the optimal source or mix of sources to apply the smoothing torque. It should be noted that the round trip efficiency of storing powertrain energy and releasing powertrain energy is always less than one. The energy deficiency associated with this energy transfer can be factored in during NVH mitigation, management of the energy level of a capacitor, from a battery, etc.

In Eqs. 3 and 4, note that the smoothing torque harmonic components $e_n$ need not have the same magnitude as their corresponding engine generated harmonic components $a_n$. That is, the smoothing torque need not eliminate all NVH, but instead may bring it down to a target, acceptable NVH level. At the target NVH level, the NVH may be composed of two components, NVH from harmonics that are not mitigated, i.e. the higher harmonics and NVH from harmonics that may be incompletely cancelled.

Thus, the challenge is to determine the lowest level of energy consumption required to reach a target, acceptable NVH. This optimization problem may be expressed as a cost function captured by the following equation:

$$\min_{e_n} P = \sqrt{\frac{1}{2} \sum_{n=1}^{\infty} (e_n)^2} \quad (5)$$

subject to the following constraint:

$$NVH_{target} \geq \sqrt{\frac{1}{2} \sum_{n=1}^{\infty} w_n^2 (a_n - e_n)^2} \quad (6)$$

Figure 4:
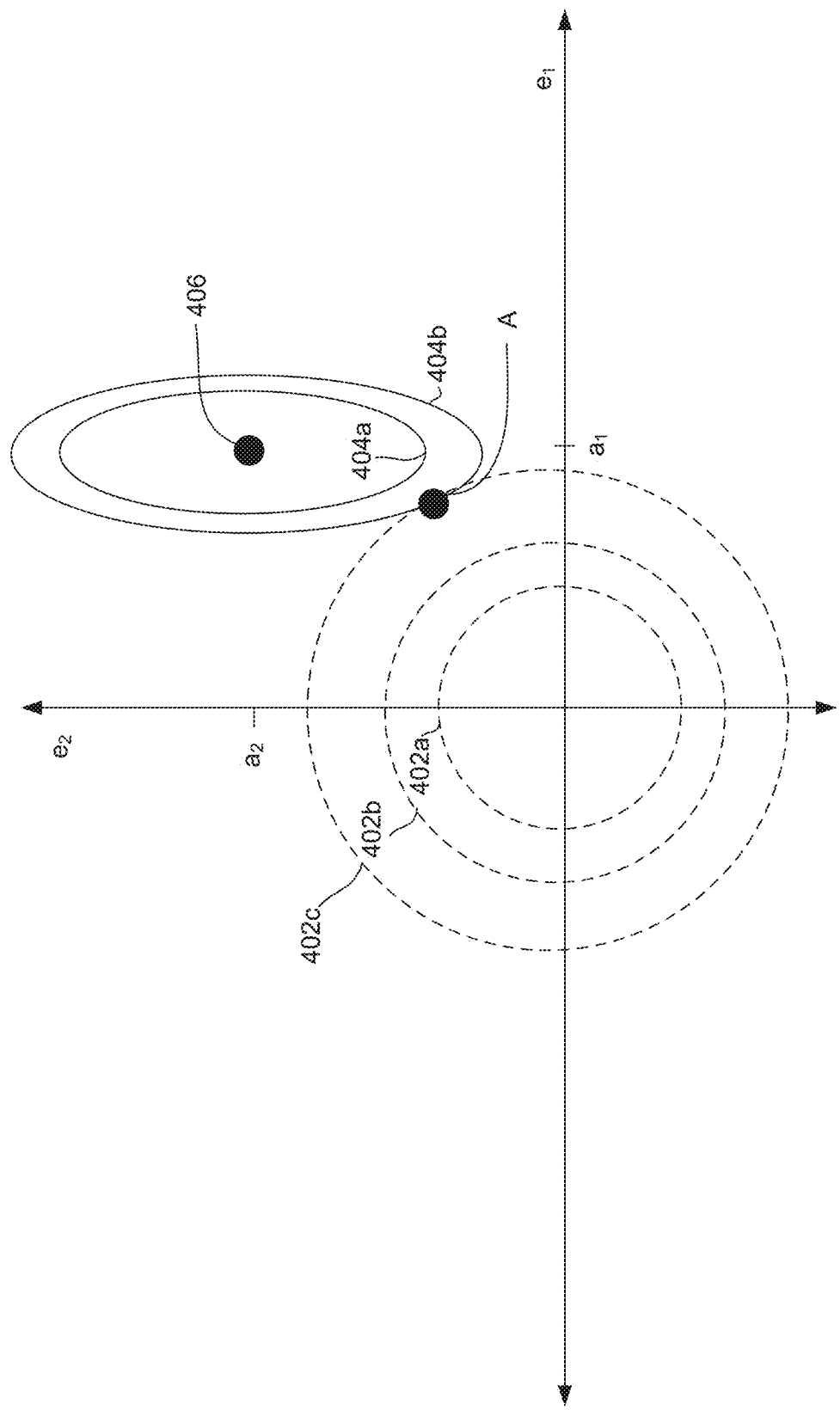
FIGS. 4 and 5 are diagrams illustrating example techniques for optimizing the reduction of NVH according to one embodiment of the present invention.
Figure 5:
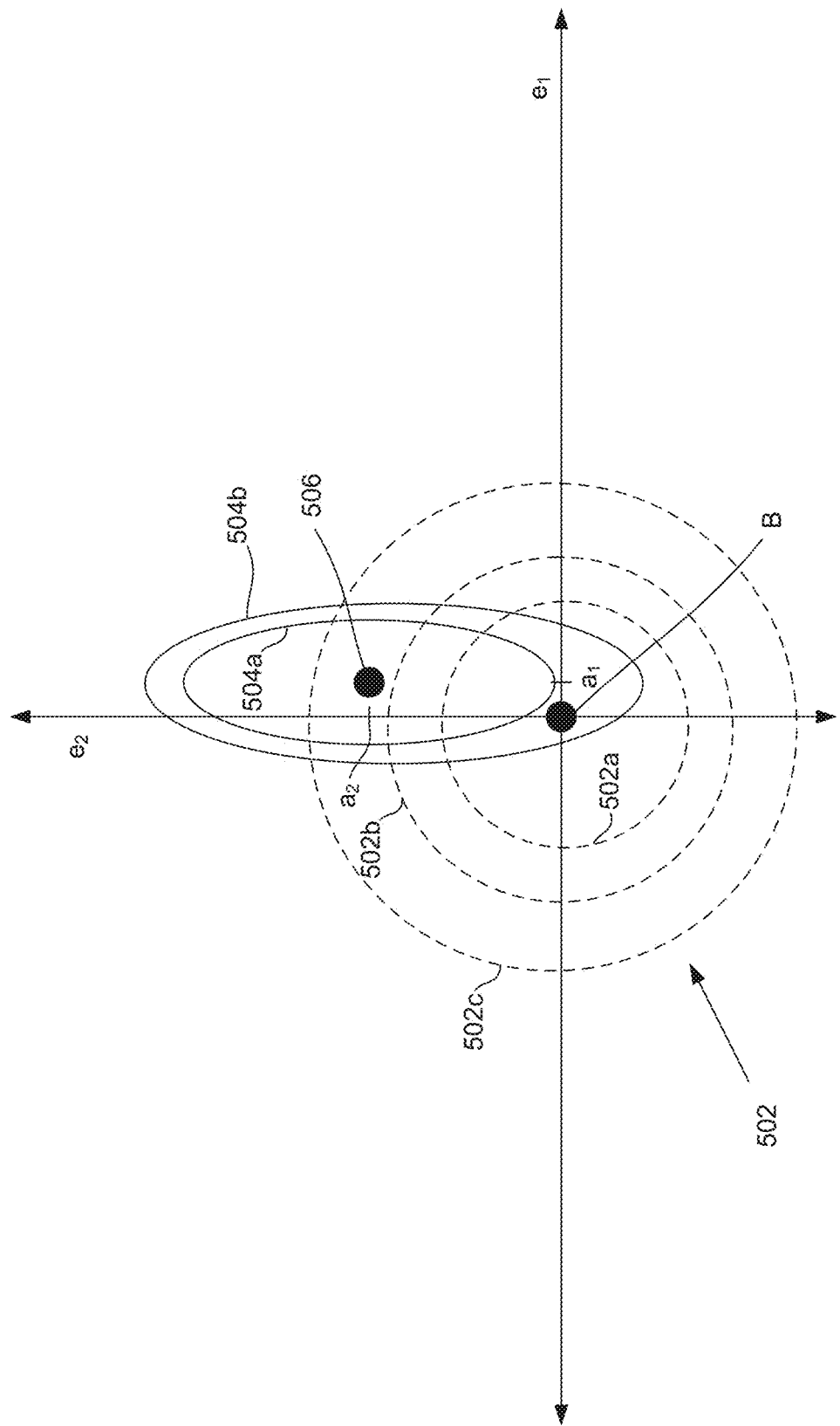

This optimization problem may be represented graphically. Two simplified examples are illustrated in FIGS. 4 and 5. FIG. 4 illustrates a set of circles 402a, 402b and 402c and a set of ellipses 404a and 404b, which represent the energy cost function i.e., equation (5) and the constraint function i.e., equation (6), respectively for a particular candidate firing fraction. This sample graph involves only the first two harmonics. The magnitude of the first harmonic smoothing torque component $e_1$ is given along the horizontal axis and the magnitude of the second harmonic smoothing torque component $e_2$ is give along the vertical axis. The values of the engine generated first and second harmonic components $a_1$ and $a_2$, respectively are noted. Each cylinder load, firing fraction, engine speed, and transmission gear will have an associated set of $a_1$ and $a_2$ that can be determined through vehicle calibration or some other means.

In FIG. 4, each concentric circle in circle set 402a-402c represents a constant amount of consumed energy to mitigate torque, assuming that the efficiency of the energy storage/release device 124 is the same for the first and second harmonic frequencies. The smaller the circle, the less energy used. The center of the circle set, the origin, indicates a point at which no energy is used, i.e. $e_1=e_2=0$. Each concentric ellipse in the ellipse set 404a-404b represents a target NVH level generated by the first and second harmonic components. Any point on or inside the chosen target NVH ellipse will produce an acceptable NVH level. The eccentricity of ellipses 404a and 404b is determined by the ratio of the weighting factors $w_2/w_1$. For equal weighting factors, the ellipses reduce to circles. Generally, humans are more sensitive to the lower frequency first harmonic and thus the ellipses are elongated vertically in FIG. 4. Less variation is required in $e_1$ than $e_2$ to change NHV by a fixed amount. The smaller the ellipse, the lower the allowed NVH. The center 406 of the ellipses 404a and 404b represents a situation in which all NVH associated with the first and second harmonics has been eliminated. At point 406, $a_1=e_1$ and $a_2=e_2$, the smoothing torque exactly cancels the first and second harmonics of the engine generated torque variation.

To optimize energy costs, it is desirable to consume as little energy as possible while bringing NVH down to an acceptable level. Assuming the acceptable NVH level is defined by ellipse 404b, this goal is realized at point A, where ellipse 404b and the circle 402c intersect. Point A yields an acceptable NVH, since it is on ellipse 404b and minimized energy consumption, since this point on ellipse 404b is closest the origin, i.e. the circle 402c is as small as possible consistent with intersecting ellipse 404b.

For purposes of comparison, FIG. 5 illustrates a diagram involving a different vehicle operating point, i.e. cylinder load, firing fraction, engine speed, and/or transmission gear. For example, the engine torque, engine speed and transmission gear may be identical to those of FIG. 4, but the firing fraction and cylinder load may be different This operating point has markedly different NVH characteristics than the firing fraction and cylinder load corresponding to FIG. 4. FIG. 5 has similar axes to FIG. 4 and the concentric circles 502a, 502b, and 502c represent constant energy expenditure from the energy storage/release device 124. Similarly, ellipses 504a and 504b represent different acceptable levels of NHV produced by the first and second harmonic components. In FIG. 5 the engine generated first and second harmonics are $a_1$ and $a_2$, respectively. If $e_1=a_1$ and $e_2=a_2$ the powertrain operates at point 506 and no NVH is produced by the first and second harmonics. Assuming that the acceptable NVH level is defined by ellipse 504b no smoothing torque from the energy storage/release device 124 is required to meet the NVH target, since point B, corresponding to $e_1=e_2=0$, lies within ellipse 504b. If ellipse 504a represented the acceptable NVH limit, then some smoothing torque mitigation would be required to reach the target.

It should be appreciated that the graphical explanation shown in FIGS. 4 and 5 is appropriate in the case where the first two harmonics may be mitigated by the energy storage/release device. If only the first harmonic is considered, the two dimensional circles and ellipses would become lines. Likewise if the first, second, and third harmonics where considered, the circles would become spheres and the ellipses would become ellipsoids. Generally the number of optimization variables equals the number of harmonics being potentially mitigated. Any number of harmonics can be mitigated if desired, but as explained above generally only mitigation of one or two harmonics is required to obtain acceptable NVH performance.

The above approach assumes that an acceptable level of NVH has been established. The acceptable level of NVH may be determined in any suitable manner. By way of example, extensive user testing can be performed to determine the amount of vibration that is acceptable to passengers in a vehicle. It should be appreciated that the acceptable level of NVH may vary dynamically based on different conditions. In some embodiments, the acceptable level of NVH is adjusted based on road conditions, user selection, operating gear, gear shift, vehicle speed, cabin noise level, presence of engine idle, the accelerator pedal position (e.g., the change in rate of the accelerator pedal position) and/or any other suitable engine parameter or criteria.

Returning to FIG. 2, using any of the above techniques, the NVH reduction module 121 determines the energy cost required to mitigate the NVH of each high NVH candidate firing fraction, such that the associated NVH is brought down to acceptable levels. The total energy cost associated with the high NVH candidate firing fraction is the sum of the mitigation costs and costs associated with operating the engine at the candidate firing fraction and cylinder load. It should be appreciated that any known technique may be performed to do this, and that the energy cost estimation process is not limited to the examples, diagrams and equations provided above.

At step 208, the NVH reduction module compares the energy costs associated with each of the candidate firing fractions. The manner in which this comparison is performed may vary depending on the characteristics of each candidate firing fraction. Consider an example in which it is assumed that each cylinder ideally is fired under optimal conditions e.g., in which throttle position, mass air charge, spark advance, valve timing, and other engine parameters are substantially optimized for fuel efficiency. Consider further that in this example, both a low NVH firing fraction and a high NVH firing fraction may be used to deliver the desired torque. The high NVH firing fraction is able to deliver the desired torque under close to optimal cylinder conditions. However, mitigation is required to reduce the resulting NVH. On the other hand, the low NVH firing fraction has the opposite problem—while it has acceptable NVH characteristics, it cannot deliver the desired torque without some adjustments in cylinder output i.e., by departing from the above optimal conditions, which results in a loss of fuel efficiency. Thus, comparing the energy costs of these two candidate firing fractions involves comparing the energy cost (losses) of adjusting the cylinder output associated with the low NVH firing fraction with the energy cost of mitigating the NVH associated with the high NVH firing fraction. Such comparisons can be performed between any number and types of candidate firing fractions.

Based on the above analysis and/or comparisons, the NVH reduction module and/or the firing fraction calculator select the candidate firing fraction that delivers the desired torque in the most fuel efficient manner (i.e., with the lowest energy cost.) In some embodiments, other factors are taken into account in the selection process. The selected candidate firing fraction becomes the operational firing fraction (step 210).

Figure 6:
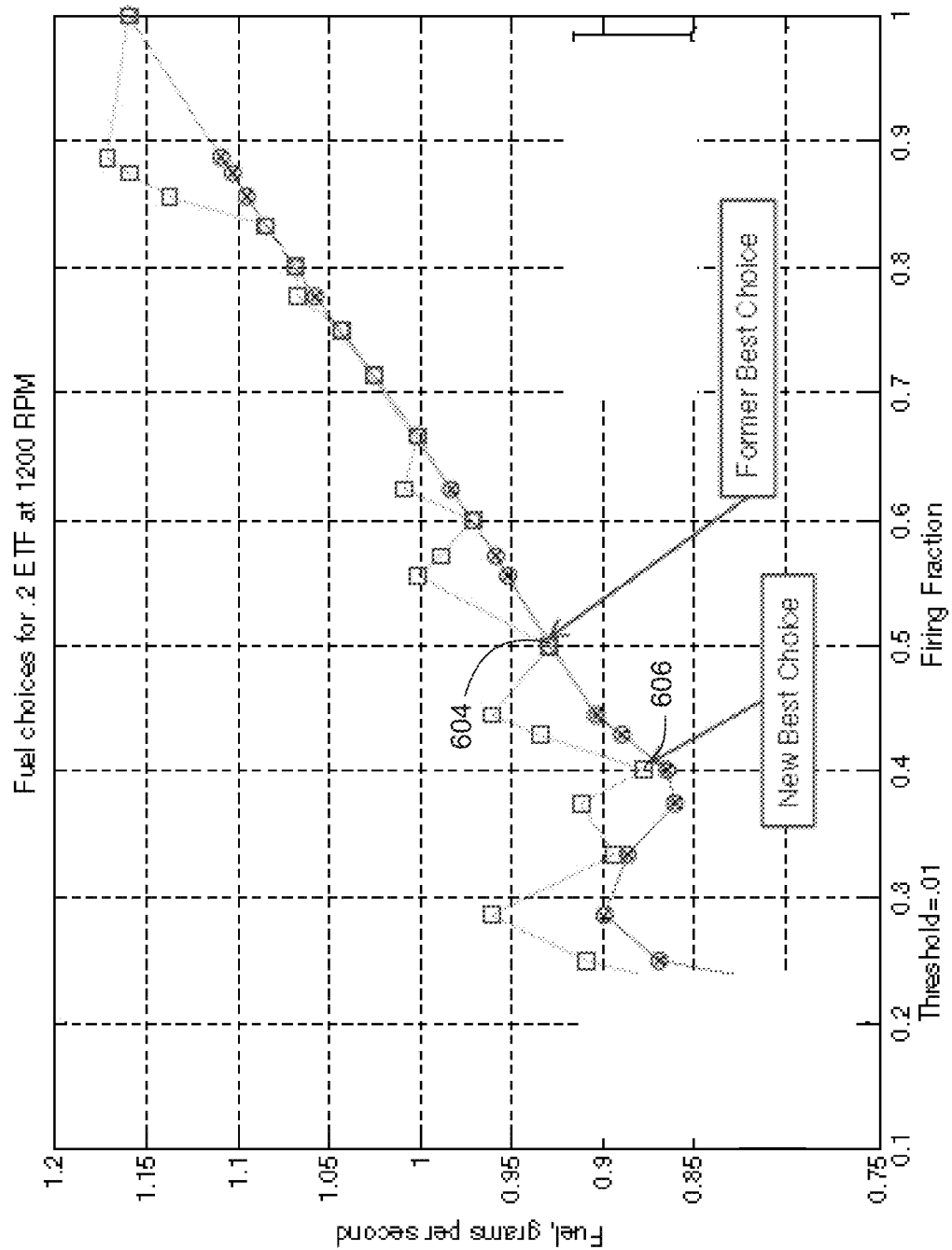
FIG. 6 is a graph of fuel consumed as a function of firing fraction according to one embodiment of the present invention.

An example process for selecting an operational firing fraction from multiple candidate firing fractions is described in FIG. 6. FIG. 6 is a graph illustrating fuel consumption, inversely related to fuel efficiency, as a function of the firing fraction. The graph assumes an engine speed of 1200 RPM and an Engine Torque Fraction (ETF) of 0.2. (In this example, ETF represents a desired engine torque. For example, an ETF=1 assumes full engine output.)

The vertical axis of the graph represents fuel consumption (grams per second). The horizontal axis represents candidate firing fractions. In this figure, data points marked by a circle within a square indicate a low NVH firing fraction, in which no NVH mitigated is required to meet an acceptable NHV. Data points with an x within the circle indicate a high NVH firing fraction, where the NVH is unacceptable without mitigation. Directly above these points are points marked with a square, which indicate the total fuel consumption associated with both operating the internal combustion engine and smoothing the torque using the aforementioned techniques to bring the NVH to an acceptable level.

Without any NVH mitigation, point 604 represents the most fuel efficient firing fraction selection i.e., a firing fraction of 0.5 that delivers the desired torque, has acceptable NVH characteristics and a fuel consumption rate of approximately 0.93 g/s. Point 606, however, is a superior choice to point 604, because point 606 requires less energy (approximately 0.87 g/s) and uses a firing fraction of 0.4, while also delivering the desired torque. Although the firing fraction of 0.4 at an engine speed of 1200 is known to generate unacceptable amounts of NVH, the NVH can be mitigated using a smoothing torque. The calculated energy cost of 0.87 g/s takes into account the energy costs of mitigation and yet is still less than the energy costs associated with point 604. Thus, in this simplified example, the firing fraction 0.4 is selected as the operational firing fraction. The fuel savings in this case ((0.93–0.87)/0.93) is about 6.5%, demonstrating the advantage of using the control method described here.

It should be noted that the selection of the operational firing faction may be based on factors other than fuel efficiency. In some embodiments, for example, the status of the energy storage/release device 124 plays a role in the selection process. That is, consider an example in which a particular high NVH firing fraction is determined to be suitable for delivering the desired torque. Additionally, the NVH reduction module 121 determines that the NVH associated with the firing fraction can be adequately mitigated with a smoothing torque e.g., using the techniques described above. The NVH reduction module 121 also determines the amount of energy required to generate a suitable smoothing torque. However, the NVH reduction module 121 and/or firing fraction calculator 112 may also determine that the firing fraction cannot be selected as the operational firing fraction, because the energy storage/release device is not currently capable of generating the necessary smoothing torque (e.g., based on battery status, a lack of stored energy, inability to provide the determined amount of energy, etc.) Conversely, if the energy storage device is nearly full, due perhaps to regenerative braking, then the cost of mitigation may be reduced compared to the prior calculation.

Returning to FIG. 2, at step 212, the firing fraction calculator 112 transmits the selected operational firing fraction to the firing timing determination module 120. Based on the operational firing fraction, the firing timing determination module 120 generates a skip fire firing sequence (step 212). At step 214, a determination is made as to whether the operational firing fraction requires NVH mitigation. If it does not (e.g., it is a low NVH firing fraction), then the method proceeds to step 222. At step 222, the engine is operated in a skip fire manner based on the firing sequence.

If it is determined that the operational firing fraction does require NVH mitigation, then the NVH reduction module 121 determines a suitable smoothing torque (step 216). The smoothing torque may involve any suitable smoothing torque or smoothing torque waveform that is applied to the powertrain by the energy storage/release device 124 to help reduce NVH generated by the firing sequence. The smoothing torque may be generated using any suitable algorithm, technique or mechanism (e.g., any of the techniques described in connection with FIG. 1.)

One approach may be described as follows. After the firing fraction calculator 112 selects an operational firing fraction and determines that a suitable smoothing torque needs to be generated, the firing fraction calculator 112 transmits the operational firing fraction to the firing timing determination module 120. The firing timing determination module then generates a skip fire firing sequence based on the operational firing fraction.

The firing sequence is transmitted to the NVH reduction module 121. The NVH reduction module analyzes the skip fire firing sequence and identifies one or more selected variations in engine torque that would be generated by the sequence. This may be performed in a wide variety of ways. In some embodiments, for example, the torque can be characterized as a torque waveform having a fixed component and a variable component (e.g., made of multiple harmonic variations/sinusoids.) Some approaches involve selecting the harmonic sinusoid whose frequency is the fundamental frequency. Other approaches involve selecting multiple harmonic sinusoids whose associated frequencies include the fundamental frequency and one or more other frequencies (e.g., the second harmonic, etc.)

The NVH reduction module 121 then generates a smoothing torque based on the selected variations/sinusoids. As previously discussed, in various approaches the smoothing torque takes the form of one or more sinusoidal waveform(s) at substantially the same frequency as the harmonics generated by the internal combustion engine. In some approaches, the smoothing torque waveform would have the same frequency as the selected variations, but be out of phase (e.g., offset by 180°) so as to cancel the torque variations generated by the engine. The smoothing torque is designed to at least partially, but not necessarily completely, cancel out the selected variation(s), which are the source of at least some NVH. In various applications, the magnitude of the smoothing torque waveform is designed to bring NVH generated by the firing sequence below a predefined level.

At step 218, the engine is operated in a skip fire manner based on the operational firing fraction selected in step 210 and its corresponding firing sequence. At step 220, the smoothing torque determined in step 216 is applied to the powertrain by the energy storage/release device 124 as the skip fire firing sequence is orchestrated at the engine. Thus, the smoothing torque helps reduce the NVH generated by the skip fire firing sequence. In various embodiments, the NVH reduction module 121 receives any suitable inputs (e.g., the firing sequence, the engine speed, the current cylinder, etc.) necessary to properly coordinate the application of the smoothing torque and the execution of the firing sequence.

The above operations of method 200 may be performed on a firing opportunity by firing opportunity basis. Alternatively, one, some or all of the above operations may be performed somewhat less frequently, such as one or more times per engine cycle.

Figure 3:
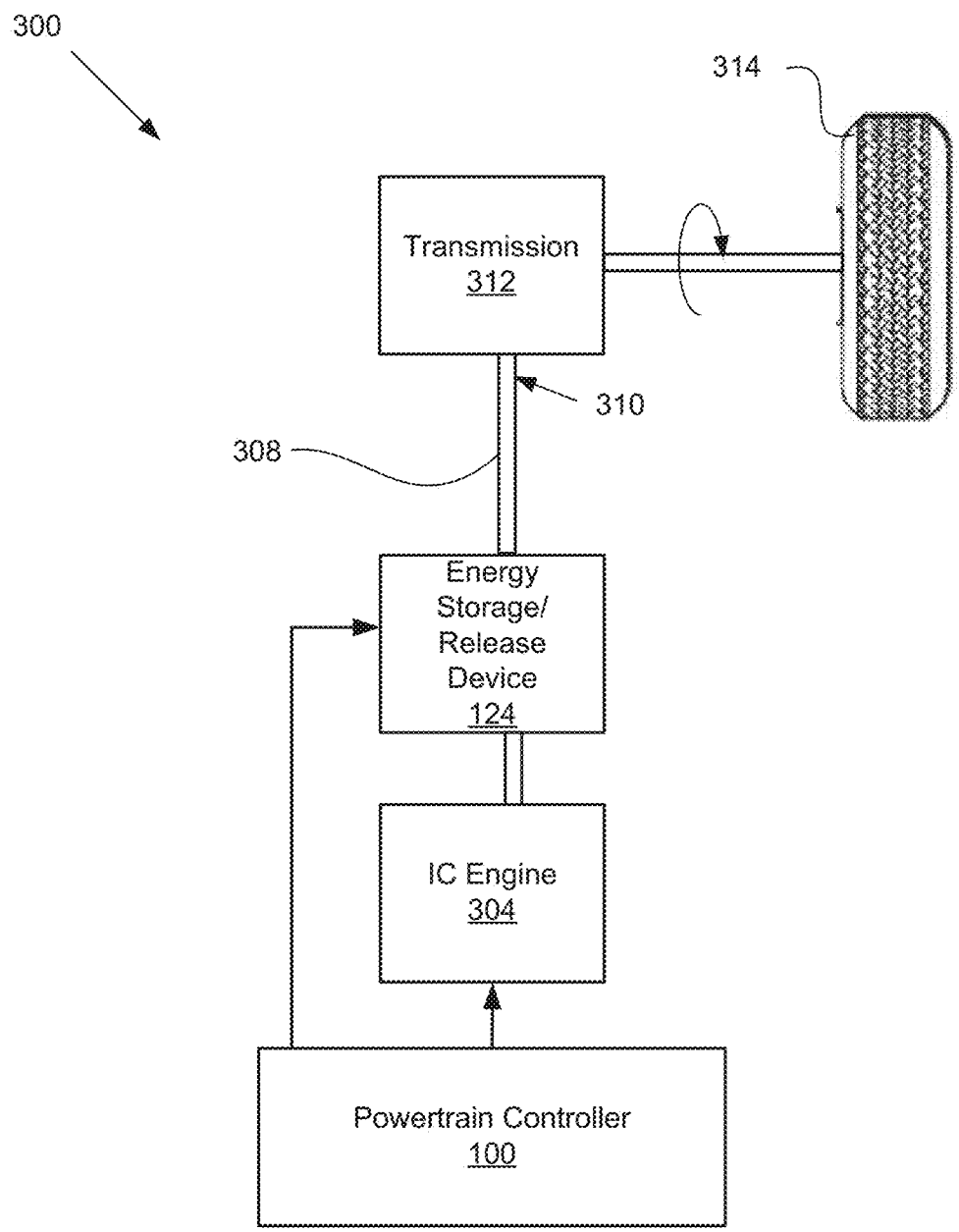
FIG. 3 is a diagram of a powertrain and a powertrain controller according to one embodiment of the present invention.

Referring next to FIG. 3, a powertrain system 300 according to a particular embodiment of the present invention will be described. The powertrain system 300 includes a powertrain controller 100, an internal combustion engine 304, an energy storage/release device 124, a crankshaft 308, a transmission 312 and wheels 314. The engine 304 and/or engine storage/release device 124 are arranged to apply torque to the crankshaft 308, which drives the wheels 314 through the transmission 312. The powertrain controller, which is described in FIG. 1, is arranged to coordinate the operation of the engine 304 and the energy storage release device 124. The powertrain system may be operated using any of the techniques described in connection with FIGS. 1, 2, 12, and 13. It should be appreciated that although a particular powertrain configuration is illustrated in FIG. 3, the components of the figure may be positioned in any suitable arrangement.

The energy storage/release device 124 is arranged to add torque to or subtract torque from the powertrain. In various embodiments, the energy storage/release device 124 generates a smoothing torque pulse waveform. The smoothing torque pulse waveform applied by the energy storage/release device 124, may be substantially a sum of one or more sinusoidal waveforms applying torque at one moment and subtracting torque at another moment. Generally, the smoothing torque pulse waveform is arranged to cancel a selected variation of torque generated by the engine (e.g., as discussed in connection with the NVH reduction module 121 of FIG. 1 and step 216 of FIG. 2.)

The energy storage/release device 124 may be any suitable device or devices that can absorb or subtract torque from the powertrain, store the resulting energy, and/or use the energy to add torque to the powertrain. In various implementations, the energy storage/release device 124 includes a motor/generator and a battery or a capacitor. In other implementations, the energy/storage release device 124 stores and releases energy mechanically (e.g., a flywheel), pneumatically or hydraulically.

Some embodiments involve an energy storage/release device 124 that is arranged to have multiple applications i.e., other applications in addition to generating a smoothing torque. In some applications, for example, the energy storage/release device 124 also subtracts torque from and adds torque to the powertrain in the same manner as any modern hybrid vehicle in order to improve fuel efficiency (e.g., using regenerative braking, etc.). That is as well as supplying an oscillating smoothing torque the energy storage/release device supplies a DC component to the powertrain torque. This DC component may be positive or negative depending on the operating conditions, the amount of energy currently stored in the energy storage/release device and other variables. The DC component may be chosen in part to compensate for the inefficiencies associated with storing and releasing energy from the energy storage/release device. The energy storage/release device 124 may also be an integrated starter-generator used to restart an engine as part of a start/stop engine system.

In various approaches, the energy storage/release device 124 is also used to smooth transitions between different firing fractions. By way of example, if the engine is operated in a skip fire manner and shifting from a lower firing fraction to a higher firing fraction, the manifold absolute pressure may take time to adjust from a higher to a lower level. That is, if the shift is made immediately, the vehicle may leap forward because the cylinder output will be too great. In various applications and under such circumstances, the energy storage/release device 124 is arranged to absorb/supply torque from/to the powertrain, thereby helping to ensure a smoother transition between the firing fractions. By way of example, the powertrain controller 100 and the energy storage/release device 124 may be operated using any of the techniques or operations described in U.S. patent application Ser. No. 13/654,244 and U.S. Provisional Patent Application No. 62/053,351, which are incorporated by reference in their entirety for all purposes.

The invention has been described primarily in the context of controlling the firing of 4-stroke piston engines suitable for use in motor vehicles. However, it should be appreciated that the described skip fire approaches are very well suited for use in a wide variety of internal combustion engines. These include engines for virtually any type of vehicle— including cars, trucks, boats, construction equipment, aircraft, motorcycles, scooters, etc.; and virtually any other application that involves the firing of working chambers and utilizes an internal combustion engine. The various described approaches work with engines that operate under a wide variety of different thermodynamic cycles—including virtually any type of two stroke piston engines, diesel engines, Otto cycle engines, Dual cycle engines, Miller cycle engines, Atkinson cycle engines, Wankel engines and other types of rotary engines, mixed cycle engines (such as dual Otto and diesel engines), radial engines, etc. It is also believed that the described approaches will work well with newly developed internal combustion engines regardless of whether they operate utilizing currently known, or later developed thermodynamic cycles.

In some preferred embodiments, the firing timing determination module utilizes sigma delta conversion. Although it is believed that sigma delta converters are very well suited for use in this application, it should be appreciated that the converters may employ a wide variety of modulation schemes. For example, pulse width modulation, pulse height modulation, CDMA oriented modulation or other modulation schemes may be used to deliver the drive pulse signal. Some of the described embodiments utilize first order converters. However, in other embodiments higher order converters or a library of predetermined firing sequences may be used.

It should be appreciated that the powertrain controller designs contemplated in this application are not limited to the specific arrangements shown in FIGS. 1 and 3. One or more of the illustrated modules may be integrated together. Alternatively, the features of a particular module may instead be distributed among multiple modules. The controller may also include additional features, modules or operations based on other co-assigned patent applications, including U.S. Pat. Nos. 7,954,474; 7,886,715; 7,849,835; 7,577,511; 8,099,224; 8,131,445; and 8,131,447; U.S. patent application Ser. Nos. 13/774,134; 13/963,686; 13/953,615; 13/886,107; 13/963,759; 13/963,819; 13/961,701; 13/963,744; 13/843,567; 13/794,157; 13/842,234; 13/004,839, 13/654,244; 13/004,844; 14/207,109; and 13/681,378 and U.S. Provisional Patent Application Nos. 61/952,737 and 61/879,481, each of which is incorporated herein by reference in its entirety for all purposes. Any of the features, modules and operations described in the above patent documents may be added to the controller 100. In various alternative implementations, these functional blocks may be accomplished algorithmically using a microprocessor, ECU or other computation device, using analog or digital components, using programmable logic, using combinations of the foregoing and/or in any other suitable manner.

A technique for reducing vibration using an electric machine is described in U.S. Pat. No. 8,015,960, although the technique differs from various embodiments of the present invention in several respects. For one, the '960 patent focuses on a variable displacement engine control system, not a skip fire engine control system. Also, the '960 patent describes the following process: 1) determining torque applied to a crankshaft; 2) extracting components from the torque attributable to uneven cylinder firings in variable displacement mode; 3) removing a fixed component (a fixed target torque) from the extracted component to leave only the variable component in the extracted components; 4) generating a vibration-damping torque that opposes the variable component generated in the third step. In other words, the vibration-damping torque is arranged to oppose all variation (i.e., after removal of the target torque) attributable to uneven cylinder firings. In various embodiments of the present invention, a smoothing torque is generated that does not necessarily oppose all variation attributable to uneven cylinder firings. Rather, in some embodiments, the smoothing torque opposes only some of the variation (e.g., the smoothing torque may oppose only one or more of the harmonic sinusoids with particular frequencies, such as the fundamental frequency, etc.) In various implementations, the smoothing torque does not oppose particular types of variations attributable to uneven cylinder firings e.g., may not oppose one or more other harmonic sinusoids. Various embodiments of the present invention also describe a control algorithm that applies only a sufficient amount of smoothing torque to meet an NVH target. The control algorithm also selects an operational firing fraction that maximizes fuel efficiency considering the energy costs associated with generating the smoothing torque. Another distinction between the current invention and the prior art is that, the frequency of the smoothing torque may not be equal to the firing frequency. For example, at 1500 RPM and a firing fraction of 40%, the firing frequency is 40 Hz, but the desired smoothing torque may have a frequency of 20 Hz.

Figure 12:
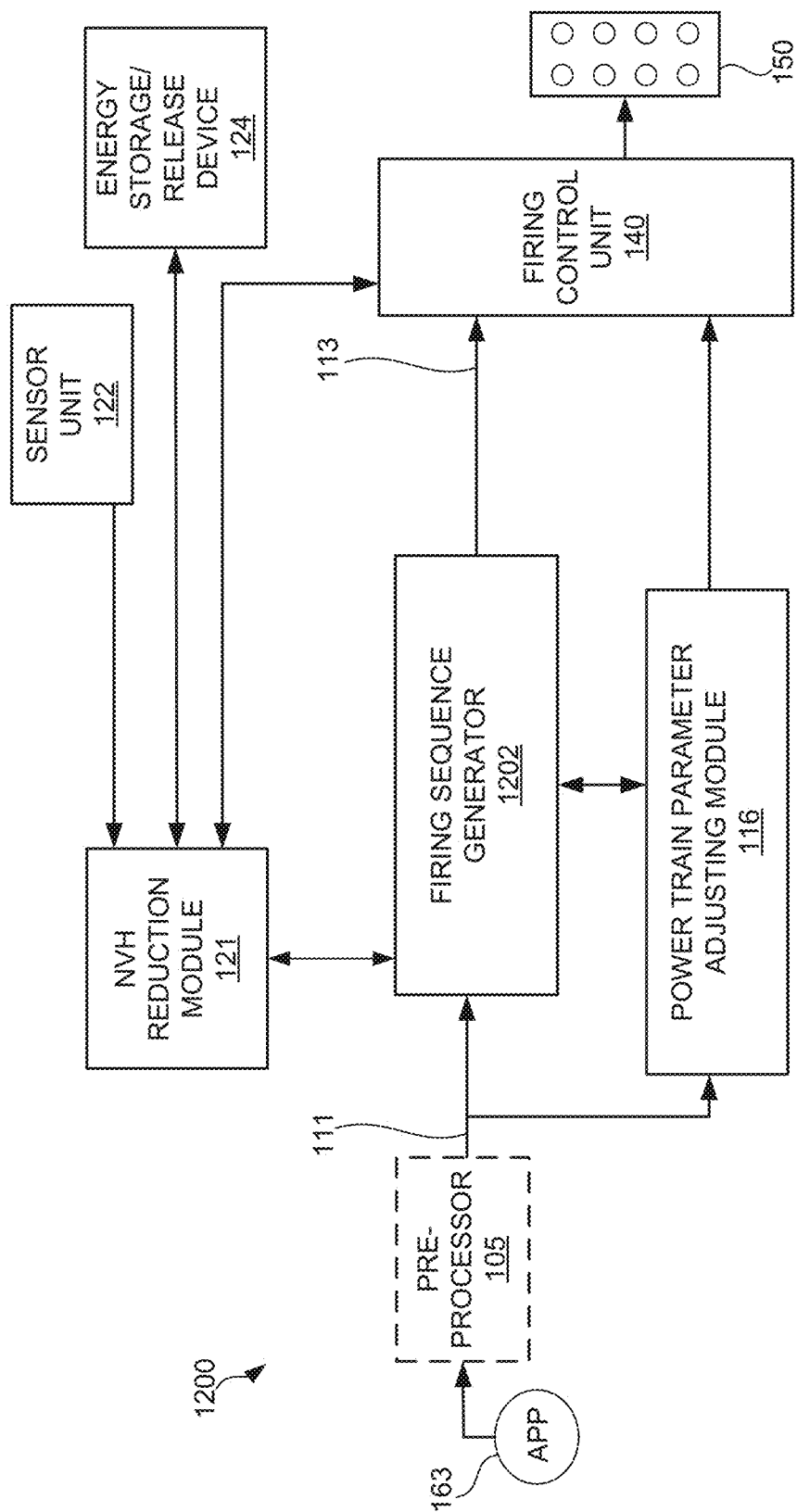
FIG. 12 is a block diagram of a powertrain controller in a skip fir engine control system according to one embodiment of the present invention.

While the invention has been generally described in terms of using a firing fraction to characterize the firing sequence, this is not a requirement. FIG. 12 shows an embodiment of a power train controller 1200. Many of the various elements of power train controller 1200 are similar or identical to those shown and described in relation to power train controller 100 shown in FIG. 1. Unlike power train controller 100, FIG. 12 shows the drive pulse signal 113 generated directly from a torque request signal 111 without reference to a firing fraction. Instead a firing sequence generator 1202 may produce drive pulse signal 113. Drive pulse signal 113 may consist of a bit stream, in which each 0 indicates a skip and each 1 indicates a fire for the current cylinder firing opportunity that defines the firing sequence. The firing decision associated with any firing opportunity is generated in advance of the firing opportunity to provide adequate time for the firing control unit 140 to correctly configure the engine, for example, deactivate a cylinder intake valve on a skipped firing opportunity. Each firing opportunity will have a known torque signature depending on whether the firing opportunity corresponds to a skip or a fire and the settings of the power train parameters defined by power train parameter adjusting module 116.

The firing sequence and smoothing torque may be determined using a variety of methods. In one embodiment short horizon model predictive control, which includes matching of the requested and delivered torque, NVH, and energy costs associated with producing the smoothing torque as part of the optimization problem may be used. In various embodiments, model predictive control is an optimal control method which straightforwardly handles systems with multiple performance criteria using a short horizon optimal control computation. In various implementations of this method a discrete optimization is performed at each time using new system measurements to compute the best system inputs to apply to the controlled system at the current time. The method repetitively solves this optimization each time a new input is desired. Inputs to the model may include the requested torque, the torque signature associated with skips and fires, acceptable NVH level, acceptable emission level, and energy costs and energy/power constraints associated with generation of a smoothing torque. Model variables may include, but are not limited to, engine speed, transmission gear setting, engine and ambient temperature, road conditions and engine parameters, such as MAP, valve timing, and spark timing.

Applying this control method may involve various combinations of power train parameters, smoothing torques and firing sequences that deliver the requested torque being determined and evaluated at each firing opportunity in the firing sequence generator 1202. The firing sequence generator 1202 may then produce a firing sequence that delivers optimum/improved fuel economy with acceptable NVH subject to the system constraints. This control method is particularly useful when the firing sequence is non-periodic, such as during a transition between firing sequences associated with changing torque requests 111 but also applies naturally to steady torque requests as well. Here short horizon may refer to firing decisions that have been made, but not yet implemented. This may be in the range of 4 to 8 firing opportunities, since these decisions are known before they are implemented, the smoothing torque can be precalculated. Constraints on the smoothing torque may include maximum allowable torque levels and frequency delivery limitation. Energy storage constraints may include current energy storage level and well as the maximum power transfer from the energy storage device.

Figure 13:
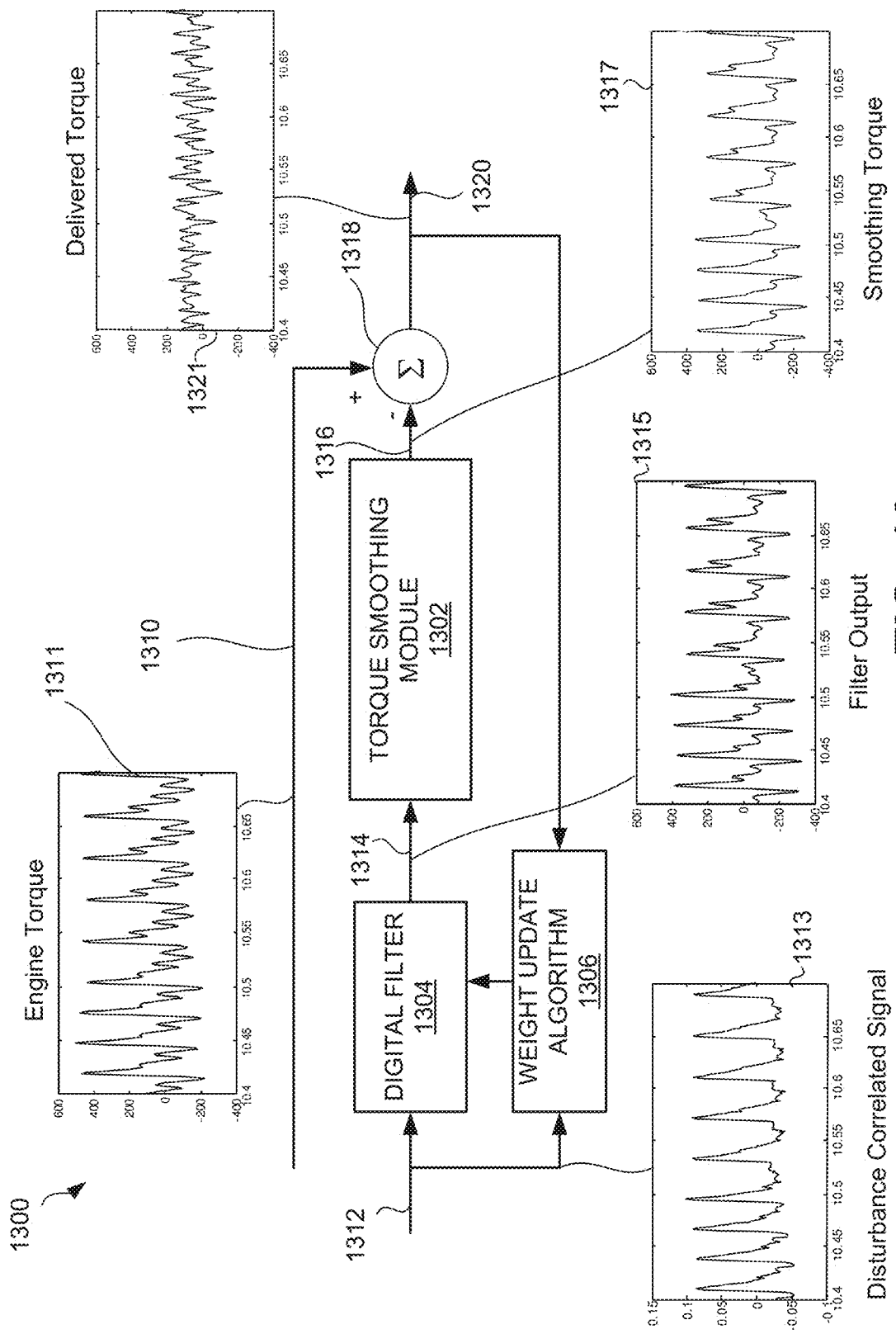
FIG. 13 is a block diagram of an adaptive filter feed forward control system according to one embodiment of the present invention.

In another embodiment adaptive filter (AF) feed forward (FF) control may be used to attenuate undesired torque oscillation caused by combustion events. In some embodiments AF-FF control can take advantage of the fact that the firing sequence and resultant torque disturbances are clearly defined. FIG. 13 shows a schematic diagram of AF-FF control. The objective of AF-FF control is to attenuate a disturbance on a system of interest, and AF-FF control achieves this objective by generating a disturbance cancelling signal which counteracts the disturbance when applied to the system. In this case the disturbance is the variation in the engine torque 1310 from its mean value. A filter output 1314 is generated by a digital filter 1304 based on an inputted disturbance correlated signal 1312. The disturbance correlated signal 1312 may have a mean value of zero, so as not to alter the average overall power train output torque. The disturbance correlated signal 1312 contains information regarding the expected disturbance with some time advance. This signal 1312 may be based on a firing sequence and estimated torque signatures associated with skips and fires. The firing sequence may be derived using a torque request, firing fraction, sigma-delta filter, a look up table, a state machine or by some other means. The filter output 1314 may be inputted to a smoothing torque module 1302, which generates a smoothing torque 1316. The smoothing torque module 1302 represents the dynamic response of a motor/generator or any other system that supplies a smoothing torque which includes any response delays or limitation so as to generate the desired smoothing torque 1316. The smoothing torque 1316 is combined with the engine torque 1310 in summing junction 1318. Summing junction 1318 outputs a delivered torque 1320 to the power train. The summing junction 1318 shows the smoothing torque 1316 being subtracted from the engine torque 1310. It should be appreciated that in other embodiments the smoothing torque may have the opposite polarity and the smoothing torque is added to the engine torque.

Adaptive filter parameters called weights may be updated by a weight update module 1306 that uses an adaptive algorithm to minimize differences between the smoothing torque 1316 and the disturbance, the engine torque 1310 less the mean value, so as to smooth the delivered torque 1320. The weight update module 1306 uses a model of smoothing torque module 1302 and inputs of both the delivered torque 1320 and disturbance correlated signal 1312 to determine the appropriate weights. The minimization may involve minimizing a mean square difference between the signals, although other minimization criteria may be used.

Graphs depicting the time behavior of the various signals in FIG. 13 are shown in order to better understand and explain operation of example power train controller 1300. The engine torque graph 1311 depicts oscillations in the engine torque output similar to those previously shown in FIG. 8. The disturbance correlated signal graph 1313 shows an estimated signal of the disturbance in engine torque which will be necessary to minimize variations in the delivered torque 1320. This estimate reflects the skip fire nature of the firings, so it will provide the necessary frequency component information to the digital filter 1304, which will result in the filter output 1314 having the proper frequency components. Based on the various weights associated with magnitude and phase response of the filter, the digital filter 1304 will adaptively control the filter output 1314 so as to minimize disturbances in delivered torque 1320. Filter output graph 1315 illustrates how the disturbance correlated signal 1312 is modified by digital filter 1304. The filter output 1314 is inputted into the smoothing torque module 1302, which includes a motor/generator or some similar system that can generate or absorb torque. The smoothing torque module 1302 outputs a smoothing torque 1316 depicted in graph 1317. Graph 1317 illustrates how the smoothing torque 1316 matches and cancels the variations in the engine torque 1310. When the smoothing torque and engine torque are combined in adder 1318 the resultant delivered torque 1320 has relatively small torque variations as depicted in graph 1321.

An advantage of various implementations of AF-FF control is that since it is a feed forward control, it can eliminate or at least minimize any disturbance in the disturbance correlated signal within the bandwidth of the smoothing torque module, provided the time advance of the disturbance correlated signal 1312 with respect to the disturbance is larger than the delay caused by the torque smoothing module 1302 and filter computations in digital filter 1304. Adaptation of the weights used in digital filter 1304 is relatively slower than the change of disturbance, but it does not restrict the ability of the controller 1300 to attenuate the disturbance. The adaptive algorithm determines the power train characteristics relating the disturbance correlated signal 1312 and the actual disturbance (variation in engine torque 1310), which are fixed or whose change rate is much slower than that of the disturbance.

Figure 14:
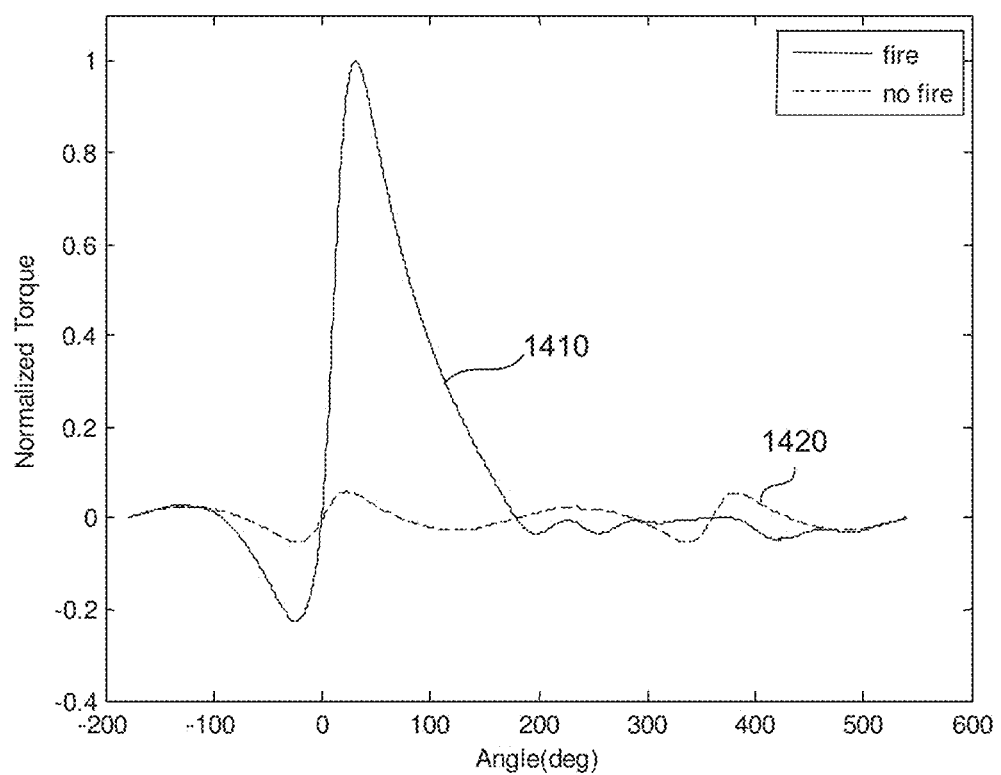
FIG. 14 is an example waveform showing torque signatures associated with cylinder firings and cylinder skips according to one embodiment of the present invention.

One input into both adaptive filter feed forward and short horizon model predictive control is the torque signature associated with cylinder skips and fires. FIG. 14 shows representative torque signatures associated with fires curve 1410 and no fires (skips) curve 1420. These representative curves depict the normalized torque output associated with a cylinder through a working cycle of 720 degrees of crankshaft rotation. These representative torque signatures can be scaled and adjusted based on the engine parameters. The total engine torque is given by the sum of the torque generated by all cylinders. The total estimated engine torque may then be used in as part of a short horizon predictive model control or an adaptive filter feed forward control system.

Torque Smoothing During Idling while the Internal Combustion Engine is Cold

When an internal combustion engine and/or aftertreatment system is/are cold, it may be advantageous to operate in a skip fire manner in order to speed up the process of heating the aftertreatment system. By reducing the time it takes for a catalytic converter to reach its operating temperature, often referred to as the 'light-off' temperature, the amount of emissions and other pollutants can be significantly reduced. One drawback of operating an internal combustion engine in a skip fire mode, still cold start and while the vehicle is idling, is excessive levels of NVH are typically created. The Applicant has found that under such circumstances, NVH is typically experienced within the passenger compartment of the vehicle as vibrations and noise from the internal combustion engine, at least partially due to operating at a firing fraction that is less than full displacement of the engine, travels through engine mounts and transmission mounts, through the frame of the vehicle, and into the cabin of the vehicle. This NVH is often perceptible to both drivers and any passengers via certain contact points, such as the seat rails, steering wheel, floor boards, and/or other body panels of the vehicle. By applying a smoothing torque, however, a cold engine while the vehicle is idling can operated in a skip fire mode, enabling the aftertreatment system to rapidly heat up and reach light off quicker, without causing excessive levels of NVH.

Cold Operating Temperatures

For a typical engine, a representative "warm" operating temperature is approximately 70° C. for the engine and/or coolant. It should be understood that what is considered a warm operating temperature may widely vary from one engine to the next. Consequently, the representative temperature provided herein is merely exemplary and should not be construed as limiting in any regard. On the contrary, the temperature at which a given engine is considered to be operating at a warm operating temperature may be higher or lower than 70° C. or around 158° F.

The light off temperature for a given aftertreatment system may also vary from vehicle to vehicle and/or the generation of technology used in the aftertreatment system of a given vehicle. For current generation aftertreatment systems relying on oxidation catalysts, the light off temperature is typically in the range of 180° to 220° C. For reduction type catalyst, the light off temperature is a bit higher, generally in the 230° to 330° C. range. Again, these light off temperatures are merely representative. With different vehicles, the temperature ranges can be higher or lower. In future generations, however, the light off temperature range is likely to trend lower.

Cold is generally referred to as any operating temperature of the engine and/or coolant that is less than whatever is considered a warm operating temperature. An internal combustion engine may be operated "cold" under a number of different scenarios. In one such example, a vehicle may be parked without the internal combustion engine running for an extended period of time. As a result, the engine cools to ambient temperature. When the engine is turned on, it is considered a "cold start" because the ambient temperature will likely be less than the warm operating temperature of the engine. While such a situation is appropriately considered a "cold start", it is by no means the only situation in which the internal combustion engine is operating in a cold state. On the contrary, any situation where a vehicle is operating and the engine is below its warm operating temperature (i.e., a threshold temperature) is considered a cold state as well. For example, a driver may park, turn off their vehicle, and then restart the vehicle a few minutes later. During the interim, the temperature of the engine and/or the aftertreatment systems may drop below their warm operating temperatures, but still above ambient temperature. In such a scenario, the engine may be considered "cold" upon restart. In another example, a vehicle may idle for an extended period of time while coasting down a long downhill stretch of road, such as a mountain pass with the engine running. Since little demand is being placed on the engine, the temperature of the engine and/or the aftertreatment system may drop below their warm operating temperatures. Thus, as used herein, the term "cold" is intended to be broadly construed to cover any situation in which the engine is operated below a threshold that is considered the warm operating temperature for a given vehicle.

It should be understood that the temperature threshold can be either an absolute or fixed temperature value (e.g., 70° C.) or can be different. For example, the warm operating temperature (i.e., the threshold temperature) can be one temperature for one vehicle, but a different temperature for another vehicle. Alternatively, for a given vehicle, the temperature threshold can be adjusted based on circumstances. For example, under a first set of circumstances the threshold can be set to a first temperature, but changed to a different temperature under a different set of circumstances.

Idling

The term "idling" as used herein is intended to be broadly construed and cover any situation where the torque converter or clutch of the transmission disconnects the internal combustion engine from the power train of the vehicle. As a result, the powertrain is to some degree isolated from internal combustion engine regardless of its engine speed (RPMs). For example, on a cold morning, a driver may let their vehicle idle for a few minutes, allowing the engine and aftertreatment system to warm up, before placing the vehicle into gear and driving. But this situation is by no means the only time a vehicle may be in an idling state. Other scenarios may include, for example, the vehicle coasting down a large mountain pass without the foot of the driver on the accelerator pedal, a driver coasting to a traffic light, again without their foot on the acceleration pedal, or when the vehicle is parked, but the engine is running.

Exhaust Temperature Control Strategies

As previously noted, skip fire engine operation involves firing one or more selected working cycles of selected cylinders and skipping others. By operating the cylinders using different operational modes during skip fire operation while the engine is cold, the temperature of the aftertreatment system of the vehicle, such as a 3-way catalyst, can be regulated. For example, the aftertreatment can be heated quicker during skip fire operation compared to operation of the internal combustion engine where all firing opportunities are fired and none are skipped.

In a first mode, the skipped cylinders are deactivated during skipped working cycles. This mode is achieved by deactivating the intake and/or exhaust valves that allow air ingress and egress into the working chamber of a cylinder. If both intake and exhaust valves are closed, gases are trapped in the cylinder effectively forming a pneumatic spring. In addition, little to no air is passed through the corresponding deactivated cylinder into the aftertreatment system. With no air pumping, the temperature of the aftertreatment system tends to heat up quicker since the lack of air prevents any cooling.

In a second mode, the intake and exhaust valves for a skipped working cylinder are not sealed during the skipped working cycle, but the cylinder is not fueled and there is no combustion. As a result, air is allowed to pump through the cylinder and into the aftertreatment system. The pumped air has the effect of diluting the exhaust stream and lowering the temperature of the aftertreatment system.

In a third mode, the intake and exhaust valves of a skipped cylinder are open and fuel is injected into the cylinder only late in the power stroke. The result is uncombusted or only slightly combusted fuel is exhausted into the aftertreatment system. These uncombusted hydrocarbons enter the oxidizing catalytic converter and react exothermically with the air. This reaction helps to heat the oxidizing catalytic converter. Such an approach can be particularly useful during an engine start-up period in which the oxidizing catalytic converter needs to be rapidly heated in order to minimize the emission of pollutants.

Controlling emissions while the internal combustion engine is cold, particularly following a cold start, is technically challenging for several reasons.

First, optimizing when to selectively implement any of the three modes described above is often complicated and requires a balancing of competing engine and aftertreatment considerations. In order to heat the catalyst more quickly, the engine should produce one or a combination of (a) more mass flow, (b) higher temperature mass flow and/or (c) mass flow with both partially combusted fuel and air that will then be combusted inside the converter. Producing more mass flow when the catalyst is not up to warm operating temperature, however, will result in more tailpipe emissions. Partially combusted fuel includes hydrocarbon compounds and carbon monoxide, both regulated toxic emissions which, until the catalyst lights off will pass through the catalyst and again result in more tailpipe emissions. Since cylinder deactivation can be used to more rapidly achieve higher temperature exhaust, a strategy of implementing any of the three modes can be used to achieve light off faster.

One particular, but not exclusive strategy, is to stagger the operation of the different modes while an internal combustion engine is idling. For example, an internal combustion engine may be operated at a relatively low firing fraction (e.g. ½ or less) while idling following a cold start, with fired cylinders operating at a nominally stoichiometric air/fuel ratio, while skipped cylinders are operated in the first mode to avoid pumping of any air into the oxidizing catalytic converter. But once the oxidizing catalytic converter temperature has started to rise, oxygen may be delivered to the catalytic converter by operating at least some of the skipped cylinders in the second and/or the third mode. With the third mode, unburned hydrocarbons injected into the aftertreatment system exothermically react in the oxidizing catalyst converter, causing the temperature of the aftertreatment system to rapidly increase, which results in less pollution and particulate emissions. A three way catalyst consists of elements that (a) oxidize hydrocarbons and carbon monoxide, and (b) reduce NOx to nitrogen and oxygen. NOx forms only under high temperatures, so is not an issue during a cold start. Oxidation catalysts work fine under conditions of extra oxygen whereas reducing catalysts do not. A strategy that introduces more oxygen with aftertreatment systems including an oxidation catalyst may therefore be beneficial.

A second challenge is that immediately following a cold start or a cold engine in general is that engine oil is typically cold and the engine oil pressure is low, below steady state, warm temperatures and/or pressure levels. Therefore, the ability of the valvetrain to effectuate the stringent timing requirements for the activation and/or deactivation of the intake and exhaust valves of the skipped cylinders while operating in any of the three modes may not be adequately fast until oil pressure and/or temperature increase.

Oil Heating and/or Pumping

In a non-exclusive embodiment, active steps can be taken to rapidly heat the engine oil faster following a cold start or while the engine is cold for any reason. For example, the engine oil can be temporarily diverted from a hot heat-exchanging surface or element, such as an electric heater or possibly passages through the cylinder head adjacent the exhaust vales of the internal combustion engine. By taking active heating steps, the engine oil can be rapidly heated relative to taking no active heating steps. In a second embodiment a variable flow/pressure oil pump can be used either in cooperation with active oil heating or may be used alone. By increasing oil pressure, valve response times needed for cylinder deactivation can be reduced. Various mechanical configurations may be used in the variable flow/pressure oil pump. For example, the variable flow/pressure oil pump may be engine driven with an electrically controlled valve allowing two distinct oil pressure levels at a given engine speed. Alternatively, the oil pump may again be engine driven and may have an electrically controlled valve allowing continuous oil pressure control semi-independent of engine speed. In another embodiment of an engine-driven oil pump, the oil pump may have an electrically controlled geometry (e.g. vane orientation) allowing continuous oil pressure control semi-independent of engine speed. In yet other embodiments, the oil pump may be a two-stage oil pump with an electrical booster pump in series with an engine driven oil pump. The electrical booster pump can be switched on to boost oil pressure as required. In yet other embodiments, the oil pump may be totally electrically driven so that the oil pressure is independent of engine speed and engine operation is not required to pressurize the engine oil.

Flow Chart for Applying Torque Smoothing During Idling with a Cold Engine

Figure 15:
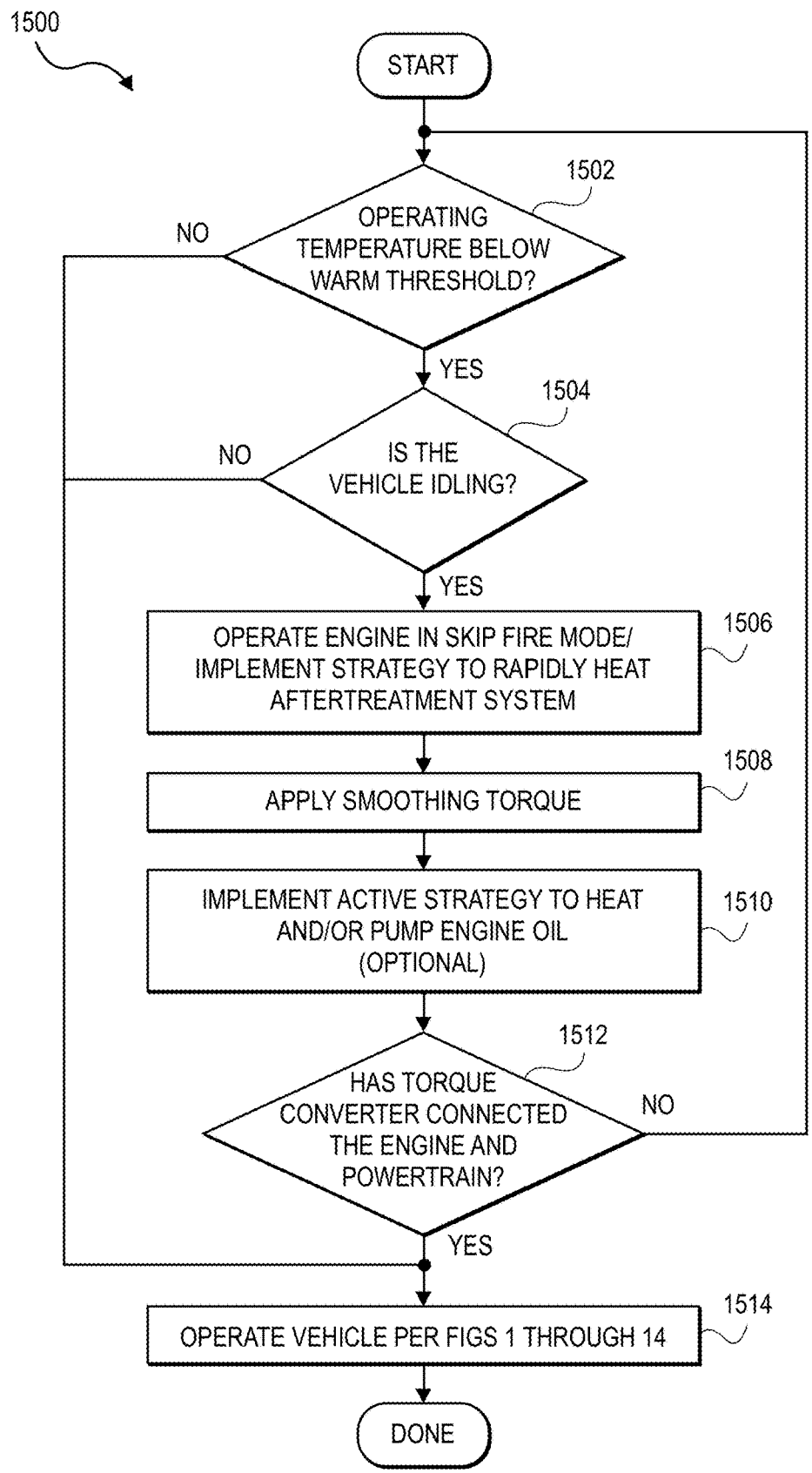
FIG. 15 is flow chart illustrating steps for applying torque smoothing during idling and an internal combustion engine is operating in a "cold state" below a threshold temperature in accordance with another non-exclusive embodiment of the invention.

Referring to FIG. 15, a flow chart 1500 illustrating steps for applying torque smoothing during idling following a cold start of the internal combustion engine 304 is shown.

In an initial decision step 1502, it is determined if the temperature of the internal combustion engine is below a "warm" operating temperature threshold. As discussed above, the temperature threshold may vary from vehicle to vehicle, but is generally defined as the temperature that is less than the warm operating temperature for a given vehicle and/or for a given set of operating conditions or circumstances. If the engine operating temperature is above the temperature threshold, then control is returned to step 1514 and the engine is operated as described above with regard to any of FIG. 1 through FIG. 14.

In a next decision step 1504, assuming the operating temperature of the internal combustion engine 304 is below the threshold temperature (i.e., the engine is cold), then it is determined if the vehicle is idling. If the torque converter and/or clutch of the vehicle has mechanically disconnected the internal combustion engine 304 from the powertrain of the vehicle, then the vehicle is idling. If the torque converter and/or clutch mechanically couples the engine 304 and the powertrain, then the vehicle is not idling. If the vehicle is not idling, regardless of the operating temperature of the internal combustion engine 304 and/or the aftertreatment system, then control is returned to step 1514 and the engine is operated as described above with regard to any of FIG. 1 through FIG. 14.

In the next step 1506, assuming the vehicle is idling and operating at a temperature below the temperature threshold; the internal combustion engine 304 is operated in a skip fire mode for the purpose of reducing fuel consumption and optionally for implementing a strategy for rapidly heating the aftertreatment system of the vehicle for the purpose of reducing pollutants and other emissions. In various embodiments, any of the heating strategies as discussed herein may be used. For instance as described above, a firing fraction of ½ may be selected and the skipped cylinders may initially operated in mode one to prevent pumping, and then in mode three to rapidly heat up the aftertreatment system by introducing unburnt fuel into the aftertreatment system. Again, this strategy is merely exemplary and should not be construed as limiting. Any firing fraction and/or strategy involving any of the three cylinder deactivation modes in any sequence order may be used.

In the next step 1508, the powertrain controller 100 directs the energy storage/release device 124 to apply a smoothing torque to the powertrain. The smoothing torque can either add or subtract toque from the power train and may vary depending on the firing fraction that has been selected as well as other variables. In one non-exclusive embodiment, the smoothing torque is a first order smoothing torque, which tends to cancel out first order engine harmonics that are prevalent when a cold internal combustion engine is idling. It should be understood, however, that a smoothing torque of any harmonic may be used and present invention is by no means limited to just a first order harmonic.

In a specific, but by no means exclusive embodiment, the desired smoothing torque applied to the powertrain can be a sinusoidal or a combination of sinusoids. In a further embodiment, when the smoothing torque motor is mounted on the Front End Accessory Drive (FEAD) belt of the vehicle that is commonly used to supply power to accessories, such as an air conditioning compressor, the dynamic characteristics of the belt drive can be compensated for in determining the actual torque waveform.

In addition, the magnitude of the smoothing torque that is applied can be decided at least in part on the expected or actual measured magnitude of the NVH experienced within the cabin of the vehicle. In situations where high levels of NVH are present or expected in the seat rails, steering wheel, floorboards, etc., then the magnitude of the smoothing torque used will typically need to be larger. Conversely, when the magnitude of the NVH is less, the magnitude of the smoothing torque can also be reduced. In yet other embodiments, the smoothing torque is applied to the crankshaft of the powertrain.

In yet another embodiment, the smoothing torque waveform and magnitude may also vary depending on the gas spring type used for skipped or deactivated cylinders. For example with High Pressure Exhaust Springs (HPES), both engine oil and coolant will tend to heat faster as well as the aftertreatment system. In contrast, with Low Pressure Exhaust Springs (LPES), only the after treatment system is heated faster. Accordingly, the shape and/or the magnitude of the smoothing torque may vary depending on if HPES, LPES or a combination of the two are used for skipped working cycles of cylinders. A LPES is realized by deactivating the intake valve(s) of a cylinder during the induction stroke of a working cycle immediately following the opening of the exhaust valve(s) of the previous working cycle in which combustion occurred, exhausting the previous charge. As a result, the pressure within the chamber is relatively low. On the other hand with HPES springs, the induction, compression and expansion strokes occur as normal for a fired cylinder. In the exhaust stroke, however, the exhaust valve(s) is/are not opened. As a result, combusted exhaust gas remains trapped within the chamber. In the next working cycle, the intake valve(s) of the cylinder is/are deactivated so that no new air is inducted. Instead, the trapped exhaust gas is expanded in the intake stroke and then compressed in the compression stroke. This results in a higher temperature gas being in contact with the cylinder walls and piston during the deactivation events and maintaining or increasing their temperature.

The torque smoothing waveform or application strategy may depend on the types of deactivation gas spring types available or chosen. For example, HPES has a large magnitude oscillating gas pressure, whereas LPES has a much smaller magnitude oscillating gas pressure, creating different torque signatures on the crankshaft, and a different torque smoothing waveform and magnitude may apply between the two. What deactivation modes the valvetrain actuation system supports is dependent on the deactivation mechanism and the engine operating condition.

In an optional step 1510, various strategies to either heat the engine oil and/or increase the engine oil pressure may be implemented. Again, implementing either or both of these strategies may help the valvetrain controller meet the stringent timing requirements needed to implement skip fire engine control or any of the rapid aftertreatment heating strategies discussed herein sooner rather than later. The implementation of either or both of these strategies obviously requires that the vehicle be equipped with a needed heat exchange surface and/or oil pump.

In decision step 1512, it is determined if the torque converter of the vehicle has mechanically connected the internal combustion engine 304 with the powertrain, which typically occurs when the driver places the vehicle into gear and begins to drive. When the internal combustion engine 304 and the powertrain are mechanically connected, the vehicle is no longer idling. In which case, the vehicle is operated in step 1514 as discussed herein with respect to any of FIG. 1 through FIG. 14. On the other hand, so long as the internal combustion engine 304 remains disconnected from the powertrain, then steps 1502 through 1512 are continually performed until either the internal combustion engine has sufficiently warmed and is no longer considered "cold" (i.e., exceeds the temperature threshold) or the vehicle is no longer idling. In either case, the vehicle is operated in step 1514 per FIG. 1 through FIG. 14 as describe herein.

In various embodiments, the internal combustion engine 304 can be either a lean burn stoichiometric gasoline engine or a Diesel engine. For gasoline engines, the aftertreatment system typically includes one of (a) a three-way catalytic converter, (b) a Gasoline Particulate Filter (GPF), or (c) both (a) and (b). For Diesel engines, the aftertreatment system typically includes one of (a) a Selective Catalytic Reduction (SCR) converter, (b) a Diesel Particulate Filter (DPF), (c) a NOx trap, or (d) any combination of (a) through (c).

Although only a few embodiments of the invention have been described in detail, it should be appreciated that the invention may be implemented in many other forms without departing from the spirit or scope of the invention. For example, the drawings and the embodiments sometimes describe specific arrangements, operational steps and control mechanisms. It should be appreciated that these mechanisms and steps may be modified as appropriate to suit the needs of different applications. For example, some or all of the operations and features of the NVH reduction module are not required and instead some or all of these operations may be transferred as appropriate to other modules, such as the firing fraction calculator and/or the firing timing determination unit. Additionally, although the method illustrated in FIG. 2 implies a particular order, it should be appreciated that this order is not required. In some embodiments, one or more of the described operations are reordered, replaced, modified or removed. While the invention is applicable to all forms of hybrid vehicles it is particularly applicable to micro-hybrids, which have relatively small energy storage and motor/generator capacity insufficient to provide the entire motive force to drive the vehicle. The invention is also applicable to engines having any number of cylinders. Various embodiments of the invention are particularly advantageous in compact vehicles having relatively small engines, such as 2, 3 or 4 cylinder engines, where the NVH associated with a low cylinder count, skip fire engine can be mitigated by a smoothing torque. Therefore, the present embodiments should be considered illustrative and not restrictive and the invention is not to be limited to the details given herein.

What is claimed is:

1. A method for operating a vehicle, the method comprising:
    detecting if an operating temperature of an internal combustion engine of the vehicle is below a threshold indicative of a warm operating temperature;
    ascertain if the vehicle is idling when the operating temperature of the internal combustion engine is below the threshold indicative of the warm operating temperature;
    operating the internal combustion engine in a skip fire mode such that some firing opportunities of cylinders of the internal combustion engine are tired while other firing opportunities of the cylinders are skipped while the vehicle is idling and the operating temperature of the internal combustion engine is below the threshold indicative of the warm operating temperature; and
    applying a smoothing torque to a powertrain of the vehicle while the internal combustion engine is operating in the skip fire manner, the vehicle is idling and the operating temperature of the internal combustion engine is below the threshold indicative of the warm operating temperature.

2. The method of claim 1, wherein the smoothing torque is a first order smoothing torque.

3. The method of claim 1, wherein the smoothing torque helps reduce Noise, Vibration and Harshness (NVH) in a cab of the vehicle.

4. The method of claim 1, further comprising heating an aftertreatment system of the vehicle by operating the internal combustion engine in the skip fire mode while the vehicle is idling and the operating temperature of the internal combustion engine is below the threshold indicative of the warm operating temperature, the heating of the aftertreatment system occurring faster compared to operating the internal combustion engine where no firing opportunities of the cylinders are skipped.

5. The method of claim 1, further comprising heating an aftertreatment system of the vehicle by manipulating intake and/or exhaust valves of one or more cylinders during one or more skipped firing opportunities such that no air is pumped into the aftertreatment system.

6. The method of claim 1, further comprising heating an aftertreatment system of the vehicle by allowing non-combusted fuel to be exhausted into the aftertreatment system during one or more skipped firing opportunities of the cylinders.

7. The method of claim 6, wherein allowing the non-combusted fuel to be exhausted into the aftertreatment system further comprises:

injecting fuel into one or more cylinders late in a power stroke of one or more of the skipped working cycles; and
exhausting the fuel injected late in the power stroke into the aftertreatment system during an exhaust stroke of the one or more skipped working cycles.

8. The method of claim 1, further comprising actively heating engine oil used by the internal combustion engine by contacting the engine oil with a heated heat-exchange surface.

9. The method of claim 1, further comprising actively increasing pressure of engine oil used by the internal combustion engine using an oil pump.

10. The method of claim 1, wherein ascertaining if the vehicle is idling or not by detecting if a torque convertor or clutch has mechanically disconnected or connected the internal combustion engine with the powertrain of the vehicle.

11. The method of claim 1, further comprising varying the smoothing torque applied to the powertrain depending on a skip fire sequence used by the internal combustion engine when operating in the skip fire mode and the vehicle is idling and the operating temperature of the internal combustion engine is below the threshold indicative of the warm operating temperature.

12. The method of claim 1, wherein applying the smoothing torque to the powertrain further comprises either adding or subtracting torque to the powertrain.

13. The method of claim 1, wherein the smoothing torque is a sinusoidal or a combination of two or more sinusoids.

14. The method of claim 1, wherein the smoothing torque compensates at least partially for dynamics of a Front End Accessory Drive (FEAD) belt of the vehicle.

15. The method of claim 1, further comprising adjusting the magnitude of the smoothing torque in proportion to the expected or actual magnitude of the Noise, Vibration and Harshness of the experienced within a cab of the vehicle.

16. The method of claim 1, further comprising operating the internal combustion engine predominately at or near a stoichiometric air/fuel ratio.

17. The method of claim 4, wherein the aftertreatment system includes one of the following:
(a) a three-way catalytic converter;
(b) a Gasoline Particulate Filter (GPF); or
(c) both (a) and (b).

18. The method of claim 4, wherein the aftertreatment system includes at least one of the following:
(a) a Selective Catalytic Reduction (SCR) converter;
(b) a Diesel Particulate Filter (DPF);
(c) a NOx trap; or
(d) any combination of (a) through (c).

19. The method of claim 1, further comprising varying the smoothing torque depending on if Low Pressure Exhaust Springs (LPES) or High Pressure Exhaust Springs are used for the firing opportunities of the cylinders that are skipped.

20. A vehicle, comprising
an internal combustion engine and a powertrain;
a skip fire controller configured to operate the internal combustion engine in a skip fire mode such that cylinders of the internal combustion engine are fired during first firing opportunities while the cylinders are skipped during second firing opportunities; and
an energy storage/release device arranged to apply a smoothing torque to the powertrain when the internal combustion engine is operating in the skip fire mode, the vehicle, and an operational temperature of the internal combustion is below a warm operating temperature threshold.

21. The vehicle of claim 20, wherein the skip fire controller is further configured to rapidly heat up an aftertreatment system fluidly coupled to the internal combustion engine by one of the following:
(i) preventing pumping of air through the cylinders into the aftertreatment system during one or more skipped working cycles;
(ii) exhausting non-burnt fuel into the aftertreatment system during one or more skipped working cycles; or
(iii) both (ii) and (iii).

22. The vehicle of claim 20, wherein the energy storage/release device is one of the following:
(i) a motor/generator;
(ii) a capacitor; or
(iii) a mechanical device that stores and releases energy.

23. The vehicle of claim 19, further comprising an oil heater configured to actively heat oil used by the internal combustion engine.

24. The vehicle of claim 20, further comprising an oil pump configured to increase pressure of engine oil used by the internal combustion engine.

25. The vehicle of claim 20, further comprising a torque convertor or clutch for selectively mechanically coupling the internal combustion engine and the powertrain.

26. The vehicle of claim 20, wherein the energy storage/release device is capable of adding or subtracting torque to/from the powertrain when applying the smoothing torque.

27. The vehicle of claim 20, wherein the smoothing torque acts to reduce Noise, Vibration and Harshness (NVH) within a cab of the vehicle, the NVH caused by vibrations caused by operation of the internal combustion engine while the vehicle is idling.

28. The vehicle of claim 20, wherein the smoothing torque is a first order harmonic smoothing torque.

29. The vehicle of claim 20, wherein the smoothing torque is a sinusoidal or a combination of two or more sinusoids.

30. The vehicle of claim 20, further comprising a Front End Accessory Drive (FEAD) belt and the smoothing torque compensates at least partially for dynamics of FEAD belt.

31. The vehicle of claim 20, wherein the smoothing torque is adjusted in magnitude in proportion to levels of Noise, Vibration and Harshness (NVH) expected or experienced within a cab of the vehicle.

32. The vehicle of claim 20, wherein the smoothing torque helps reduce NVH experienced within a cab of the vehicle, the NVH perceived within the cab of the vehicle at one or more perception points including (a) seat rails, (b) steering wheel, (c) floor board of the vehicle or (d) body panels of the vehicle.

33. The vehicle of claim 20, further comprising an aftertreatment system which includes one of the following:
   (a) a three-way catalytic converter;
   (b) a Gasoline Particulate Filter (GPF); or
   (c) both (a) and (b).

34. The vehicle of claim 20, further comprising an aftertreatment system which includes one of the following:
   (a) a Selective Catalytic Reduction (SCR) converter;
   (b) a Diesel Particulate Filter (DPF);
   (c) a NOx trap; or
   (d) any combination of (a) through (c).

35. The vehicle of claim 20, wherein the internal combustion engine is either a gasoline engine or a Diesel engine.

36. The vehicle of claim 20, wherein the internal combustion engine runs a lean stoichiometric air/fuel ratio.

37. The vehicle of claim 20, wherein the smoothing torque is varied depending on if Low Pressure Exhaust Springs (LPES) or High Pressure Exhaust Springs are used for the second firing opportunities of the cylinders that are skipped.

* * * * *